United States Patent
Tsuchiyama et al.

(10) Patent No.: US 9,501,362 B2
(45) Date of Patent: Nov. 22, 2016

(54) RAID CONFIGURATION MANAGEMENT DEVICE AND RAID CONFIGURATION MANAGEMENT METHOD

(71) Applicant: FUJITSU LIMITED, Kawasaki-shi, Kanagawa (JP)

(72) Inventors: Yukari Tsuchiyama, Kawasaki (JP); Hidejirou Daikokuya, Kawasaki (JP); Kazuhiko Ikeuchi, Kawasaki (JP); Chikashi Maeda, Kawasaki (JP); Kazuhiro Urata, Kawasaki (JP); Takeshi Watanabe, Kawasaki (JP); Norihide Kubota, Kawasaki (JP); Kenji Kobayashi, Kawasaki (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 14/492,102

(22) Filed: Sep. 22, 2014

(65) Prior Publication Data

US 2015/0121002 A1  Apr. 30, 2015

(30) Foreign Application Priority Data

Oct. 24, 2013 (JP) .................................. 2013-221626

(51) Int. Cl.
G06F 3/06 (2006.01)
G06F 11/10 (2006.01)

(52) U.S. Cl.
CPC .................................. *G06F 11/1096* (2013.01)

(58) Field of Classification Search
CPC .. G06F 11/1076; G06F 11/1096; G06F 3/06; G06F 3/0604; G06F 3/0653; G06F 3/0689; G06F 2003/0692; G06F 2003/0697; G06F 11/20; G06F 11/00; G06F 11/16; G06F 12/00
See application file for complete search history.

(56) References Cited

U.S. PATENT DOCUMENTS

| | | | | |
|---|---|---|---|---|
| 5,581,753 A * | 12/1996 | Terry | ................. | G06F 17/30371 |
| 7,577,812 B2 | 8/2009 | Fujibayashi et al. | | |
| 8,095,577 B1 * | 1/2012 | Faibish | ............. | G06F 17/30091 |
| | | | | 707/823 |
| 8,769,196 B1 * | 7/2014 | Sadhu | ................. | G06F 12/0868 |
| | | | | 711/100 |
| 2003/0056142 A1 * | 3/2003 | Hashemi | ............. | G06F 11/1084 |
| | | | | 714/6.21 |
| 2004/0024963 A1 * | 2/2004 | Talagala | ............... | G06F 11/1076 |
| | | | | 711/114 |
| 2006/0077724 A1 * | 4/2006 | Chikusa | ............... | G06F 11/1076 |
| | | | | 365/189.05 |
| 2006/0184760 A1 * | 8/2006 | Fujibayashi | .......... | G06F 3/0607 |
| | | | | 711/170 |
| 2006/0206662 A1 * | 9/2006 | Ludwig | ................. | G06F 3/0607 |
| | | | | 711/114 |

(Continued)

FOREIGN PATENT DOCUMENTS

JP 2004-054806 2/2004
JP 2006-221526 8/2006

*Primary Examiner* — Jared Rutz
*Assistant Examiner* — Jean Edouard
(74) *Attorney, Agent, or Firm* — Fujitsu Patent Center

(57) ABSTRACT

A CM 10 includes an unmount detector 142 and a mount detector 144 that monitor unmount and mount of each disk 21 of a RAID configuration, a write request manager 143 that manages a write request for writing data to a disk 21 that is unmounted, a consistency determination unit 145 that, when mount of a disk 21 of the RAID configuration is detected, makes a determination on consistency of the data of the disk 21 in which mount is detected on the basis of the managed write request, and a RAID incorporating unit that, when it is determined that the data lacks consistency, performs processing for recovering data expected to be written by the write request issued to the disk 21 in which mount is detected while the disk 21 is unmounted and incorporates the disk 21 in an original RAID configuration.

5 Claims, 17 Drawing Sheets

(56) References Cited

U.S. PATENT DOCUMENTS

| | | | |
|---|---|---|---|
| 2006/0206752 A1* | 9/2006 | Ikeuchi | G06F 11/1076 714/6.22 |
| 2007/0214194 A1* | 9/2007 | Reuter | G06F 17/30067 |
| 2010/0229033 A1* | 9/2010 | Maeda | G06F 11/1076 714/6.32 |
| 2011/0022709 A1* | 1/2011 | Xu | A63F 13/12 709/224 |
| 2011/0296103 A1* | 12/2011 | Igashira | G06F 3/0607 711/114 |
| 2012/0011317 A1* | 1/2012 | Ikeuchi | G06F 3/0613 711/114 |
| 2012/0030417 A1* | 2/2012 | Cho | G06F 13/385 711/105 |
| 2012/0331338 A1* | 12/2012 | Cho | G06F 11/1441 714/6.24 |
| 2013/0124798 A1* | 5/2013 | Aszmann | G06F 3/0689 711/114 |
| 2013/0145209 A1* | 6/2013 | Saito | G06F 11/1076 714/6.32 |
| 2013/0268709 A1* | 10/2013 | Brundridge | G06F 13/4081 710/304 |

* cited by examiner

FIG.3

| | | | | |
|---|---|---|---|---|
| 131a | RAID GROUP NUMBER | 0 | 1 | ... |
| 131b | RAID TYPE (RAID LEVEL) | RAID 1 | RAID 5 | ... |
| 131c | RAID STATE | AVAILABLE | AVAILABLE | ... |
| 131d | RAID CONFIGURATION DISK NUMBER | 2 | 3 | ... |
| 131e | RAID CONFIGURATION DISK POSITION INFORMATION | DE#00 Slot#00 | DE#01 Slot#00 | ... |
| | RAID CONFIGURATION DISK POSITION INFORMATION | DE#00 Slot#01 | DE#01 Slot#01 | ... |
| | RAID CONFIGURATION DISK POSITION INFORMATION | – | DE#01 Slot#02 | ... |
| 131f | IN-USE SPARE DISK POSITION INFORMATION | – | – | ... |

FIG.4

| | | | | | | |
|---|---|---|---|---|---|---|
| 132a | DE NUMBER | 0 | 0 | 0 | 0 | ... |
| 132b | SLOT NUMBER | 0 | 1 | 2 | ... | ... |
| 132c | DISK IDENTIFIER (DEVICE NAME UNIQUE TO DISK) | 300000E0DE00000F | 300000E0DE00010F | — | ... | ... |
| 132d | SLOT STATE | AVAILABLE | AVAILABLE | NOT AVAILABLE | ... | ... |
| 132e | WRITING-PRECEDING TIMESTAMP | 0x000000010bf90e0 | 0x000000010bf90e0 | — | ... | ... |
| 132f | WRITING-COMPLETION TIMESTAMP | 0x000000010bf90e0 | 0x000000010bf90e0 | — | ... | ... |

| | | | | | | | | |
|---|---|---|---|---|---|---|---|---|
| 132a | DE NUMBER | 1 | 1 | 1 | 1 | 1 | ... | 1 |
| 132b | SLOT NUMBER | 0 | 1 | 2 | 3 | 4 | ... | 11 |
| 132c | DISK IDENTIFIER (DEVICE NAME UNIQUE TO DISK) | 0x300000E0DE000C0F | 0x300000E0DE000C0F | — | 300000E0DE000F0F | — | ... | 300000E0DE00100F |
| 132d | SLOT STATE | AVAILABLE | AVAILABLE | NOT AVAILABLE | PRESENT | NOT AVAILABLE | ... | SPARE |
| 132e | WRITING-PRECEDING TIMESTAMP | 0x000000010bf7e60 | 0x000000010bf7e60 | — | — | — | ... | — |
| 132f | WRITING-COMPLETION TIMESTAMP | 0x000000010bf7e60 | 0x000000010bf7e60 | — | — | — | ... | — |

FIG.5

| | | | | 133 | |
|---|---|---|---|---|---|
| 133a | WRITING MANAGEMENT SEQUENCE NUMBER | 0 | 1 | ... |
| 133b | MANAGEMENT METHOD | METHOD 1 | – | ... |
| 133c | WRITING INFORMATION UPPER LIMIT NUMBER | 1000 | – | ... |
| 133d | WRITING INFORMATION NUMBER | 0 | – | ... |
| 133e | MEMORY BUFFER UPPER LIMIT NUMBER | – | – | ... |
| 133f | DATA NUMBER | – | – | ... |
| 133g | RAID GROUP NUMBER | 1 | – | ... |
| 133h | RAID TYPE | RAID 5 | – | ... |
| 133i | DISK-IDENTIFYING INFORMATION (DE NUMBER/SLOT NUMBER) | DE#01 Slot#2 | – | ... |
| 133j | UNMOUNT TIMESTAMP | 0x0000000010bf8f60 | – | ... |
| 133k | VALIDITY FLAG | 0x1 | 0x0 | ... |

FIG.12

| | | |
|---|---|---|
| | RAID GROUP NUMBER | 1 |
| | RAID TYPE (RAID LEVEL) | RAID 5 |
| 131c | RAID STATE | EXPOSED |
| | RAID CONFIGURATION DISK NUMBER | 3 |
| | RAID CONFIGURATION DISK POSITION INFORMATION | DE#01 Slot#00 |
| | RAID CONFIGURATION DISK POSITION INFORMATION | DE#01 Slot#01 |
| | RAID CONFIGURATION DISK POSITION INFORMATION | DE#01 Slot#02 |
| 131f | IN-USE SPARE DISK POSITION INFORMATION | DE#01 Slot#11 |

(131)

| | | | | |
|---|---|---|---|---|
| | DE NUMBER | 1 | | 1 |
| | SLOT NUMBER | 2 | | 11 |
| | DISK IDENTIFIER | 0x300000E0DE000C0F | ... | 300000E0DE00100F |
| 132d | SLOT STATE | BROKEN | | REBUILD |
| | WRITING-PRECEDING TIMESTAMP | 0x0000000010bf7e60 | | 0x0000000010bf7e60 |
| | WRITING-COMPLETION TIMESTAMP | 0x0000000010bf7e60 | | 0x0000000010bf7e60 |

(132)

| | | |
|---|---|---|
| | WRITING MANAGEMENT SEQUENCE NUMBER | 0 |
| 133b | MANAGEMENT METHOD | METHOD 1 |
| | WRITING INFORMATION UPPER LIMIT NUMBER | 1000 |
| | WRITING INFORMATION NUMBER | 0 |
| | MEMORY BUFFER UPPER LIMIT NUMBER | – |
| | DATA NUMBER | – |
| 133g | RAID GROUP NUMBER | 1 |
| 133h | RAID TYPE | RAID 5 |
| 133i | DISK-IDENTIFYING INFORMATION | DE#01 Slot#2 |
| 133j | UNMOUNT TIMESTAMP | 0x0000000010bf8f60 |
| | VALIDITY FLAG | 0x1 |

| DE NUMBER | 1 | ... | 1 |
|---|---|---|---|
| SLOT NUMBER | 2 | | 11 |
| DISK IDENTIFIER | 0x300000E0DE000C0F | | 300000E0DE00100F |
| SLOT STATE | BROKEN | | REBUILD |
| WRITING-PRECEDING TIMESTAMP | 0x0000000010bfa360 | | 0x0000000010bf7e60 |
| WRITING-COMPLETION TIMESTAMP | 0x0000000010bf7e60 | | 0x0000000010bf7e60 |

132 ← table above; 132e ← WRITING-PRECEDING TIMESTAMP row; 132f ← WRITING-COMPLETION TIMESTAMP row

| WRITING MANAGEMENT SEQUENCE NUMBER | 0 |
|---|---|
| MANAGEMENT METHOD | METHOD 1 |
| WRITING INFORMATION UPPER LIMIT NUMBER | 1000 |
| WRITING INFORMATION NUMBER | 2 |
| MEMORY BUFFER UPPER LIMIT NUMBER | – |
| DATA NUMBER | – |
| RAID GROUP NUMBER | 1 |
| RAID TYPE | RAID 5 |
| DISK-IDENTIFYING INFORMATION | DE#01 Slot#2 |
| UNMOUNT TIMESTAMP | 0x0000000010bf8f60 |
| VALIDITY FLAG | 0x1 |

133 ← table above; 133d ← WRITING INFORMATION NUMBER row

| WRITING MANAGEMENT SEQUENCE NUMBER | 0 | 0 |
|---|---|---|
| SEQUENCE NUMBER | 0 | 1 |
| MEMORY BUFFER ADDRESS | – | – |
| WRITING DATA TOP DISK LBA | 0x0000000000001000 | 0x0000000000003180 |
| WRITING BLOCK NUMBER | 0x80 | 0x80 |

134 ← table above; 134a, 134b, 134d, 134e label the respective rows

FIG.14

| RAID GROUP NUMBER | 1 | 131 |
|---|---|---|
| RAID TYPE (RAID LEVEL) | 10.5 | |
| 131c — RAID STATE | EXPOSED | |
| RAID CONFIGURATION DISK NUMBER | 3 | |
| RAID CONFIGURATION DISK POSITION INFORMATION | DE#01 Slot#00 | |
| RAID CONFIGURATION DISK POSITION INFORMATION | DE#01 Slot#01 | |
| RAID CONFIGURATION DISK POSITION INFORMATION | DE#01 Slot#02 | |
| 131f — IN-USE SPARE DISK POSITION INFORMATION | — | |

| | | 132 | | |
|---|---|---|---|---|
| DE NUMBER | 1 | | 1 | |
| SLOT NUMBER | 2 | | 11 | |
| DISK IDENTIFIER | 0x300000E0DE000C0F | ... | — | |
| 132d — SLOT STATE | BROKEN | | NOT AVAILABLE | |
| WRITING-PRECEDING TIMESTAMP | 0x0000000010bf7e60 | | — | |
| WRITING-COMPLETION TIMESTAMP | 0x0000000010bf7e60 | | — | |

| | | 133 |
|---|---|---|
| WRITING MANAGEMENT SEQUENCE NUMBER | 0 | |
| 133b — MANAGEMENT METHOD | METHOD 2 | |
| WRITING INFORMATION UPPER LIMIT NUMBER | 1000 | |
| WRITING INFORMATION NUMBER | 0 | |
| 133e — MEMORY BUFFER UPPER LIMIT NUMBER | 100 | |
| 133f — DATA NUMBER | 0 | |
| 133g — RAID GROUP NUMBER | 1 | |
| 133h — RAID TYPE | RAID 5 | |
| 133i — DISK-IDENTIFYING INFORMATION | DE#01 Slot#2 | |
| 133j — UNMOUNT TIMESTAMP | 0x0000000010bf8f60 | |
| VALIDITY FLAG | 0x1 | |

FIG.15

| DE NUMBER | 1 |
|---|---|
| SLOT NUMBER | 2 |
| DISK IDENTIFIER | 0x300000E0DE000C0F |
| SLOT STATE | BROKEN |
| WRITING-PRECEDING TIMESTAMP | 0x0000000010bfa360 |
| WRITING-COMPLETION TIMESTAMP | 0x0000000010bf7e60 |

132e — WRITING-PRECEDING TIMESTAMP
132f — WRITING-COMPLETION TIMESTAMP
132

| WRITING MANAGEMENT SEQUENCE NUMBER | 0 |
|---|---|
| MANAGEMENT METHOD | METHOD 2 |
| WRITING INFORMATION UPPER LIMIT NUMBER | 1000 |
| WRITING INFORMATION NUMBER | 3 |
| MEMORY BUFFER UPPER LIMIT NUMBER | 100 |
| DATA NUMBER | 3 |
| RAID GROUP NUMBER | 1 |
| RAID TYPE | RAID 5 |
| DISK-IDENTIFYING INFORMATION | DE#01 Slot#2 |
| UNMOUNT TIMESTAMP | 0x0000000010bf8f60 |
| VALIDITY FLAG | 0x1 |

133d — WRITING INFORMATION NUMBER
133

| WRITING MANAGEMENT SEQUENCE NUMBER | 0 | 0 | 0 |
|---|---|---|---|
| SEQUENCE NUMBER | 0 | 1 | 2 |
| MEMORY BUFFER ADDRESS | 0x0000000030000000 | 0x000000003000A000 | 0x000000003000A080 |
| WRITING DATA TOP DISK LBA | 0x0000000000001000 | 0x0000000000003180 | 0x000000003000A080 |
| WRITING BLOCK NUMBER | 0x80 | 0x80 | 0x80 |

134a — WRITING MANAGEMENT SEQUENCE NUMBER
134b — SEQUENCE NUMBER
134c — MEMORY BUFFER ADDRESS
134d — WRITING DATA TOP DISK LBA
134e — WRITING BLOCK NUMBER
134

FIG.16

| RAID GROUP NUMBER | 1 | 131 |
|---|---|---|
| RAID TYPE (RAID LEVEL) | RAID 5 | |
| RAID STATE (131c) | EXPOSED | |
| RAID CONFIGURATION DISK NUMBER | 3 | |
| RAID CONFIGURATION DISK POSITION INFORMATION | DE#01 Slot#00 | |
| RAID CONFIGURATION DISK POSITION INFORMATION | DE#01 Slot#01 | |
| RAID CONFIGURATION DISK POSITION INFORMATION | DE#01 Slot#02 | |
| IN-USE SPARE DISK POSITION INFORMATION (131f) | — | |

| DE NUMBER | 1 | 132 | | 1 |
|---|---|---|---|---|
| SLOT NUMBER | 2 | | | 11 |
| DISK IDENTIFIER | 0x300000E0DE000C0F | ... | | — |
| SLOT STATE (132d) | BROKEN | | | NOT AVAILABLE |
| WRITING-PRECEDING TIMESTAMP | 0x0000000010bf7e60 | | | — |
| WRITING-COMPLETION TIMESTAMP | 0x0000000010bf7e60 | | | — |

| | | 133 |
|---|---|---|
| WRITING MANAGEMENT SEQUENCE NUMBER | 0 | |
| MANAGEMENT METHOD (133b) | METHOD 3 | |
| WRITING INFORMATION UPPER LIMIT NUMBER | 1000 | |
| WRITING INFORMATION NUMBER | 0 | |
| MEMORY BUFFER UPPER LIMIT NUMBER (133e) | — | |
| DATA NUMBER (133f) | — | |
| RAID GROUP NUMBER (133g) | 1 | |
| RAID TYPE (133h) | RAID 5 | |
| DISK-IDENTIFYING INFORMATION (133i) | DE#01 Slot#2 | |
| UNMOUNT TIMESTAMP (133j) | 0x0000000010bf8f60 | |
| VALIDITY FLAG | 0x1 | |

FIG.17

| DE NUMBER | 1 |
|---|---|
| SLOT NUMBER | 2 |
| DISK IDENTIFIER | 0x300000E0DE000E0F |
| SLOT STATE | BROKEN |
| WRITING-PRECEDING TIMESTAMP | 0x0000000010bfa360 |
| WRITING-COMPLETION TIMESTAMP | 0x0000000010bf7e60 |

132e — WRITING-PRECEDING TIMESTAMP
132f — WRITING-COMPLETION TIMESTAMP
132

| WRITING MANAGEMENT SEQUENCE NUMBER | 0 |
|---|---|
| MANAGEMENT METHOD | METHOD 3 |
| WRITING INFORMATION UPPER LIMIT NUMBER | 1000 |
| WRITING INFORMATION NUMBER | 2 |
| MEMORY BUFFER UPPER LIMIT NUMBER | - |
| DATA NUMBER | - |
| RAID GROUP NUMBER | 1 |
| RAID TYPE | RAID 5 |
| DISK-IDENTIFYING INFORMATION | DE#01 Slot#2 |
| UNMOUNT TIMESTAMP | 0x0000000010bf8f60 |
| VALIDITY FLAG | 0x1 |

133d — WRITING INFORMATION NUMBER
133

| WRITING MANAGEMENT SEQUENCE NUMBER | 0 | 0 |
|---|---|---|
| SEQUENCE NUMBER | 0 | 1 |
| MEMORY BUFFER ADDRESS | - | - |
| WRITING DATA TOP DISK LBA | 0x0000000000001000 | 0x0000000000003180 |
| WRITING BLOCK N | 0x80 | 0x80 |

134a — WRITING MANAGEMENT SEQUENCE NUMBER
134b — SEQUENCE NUMBER
134d — WRITING DATA TOP DISK LBA
134e — WRITING BLOCK N
134

RAID CONFIGURATION MANAGEMENT DEVICE AND RAID CONFIGURATION MANAGEMENT METHOD

CROSS-REFERENCE TO RELATED APPLICATION(S)

This application is based upon and claims the benefit of priority of the prior Japanese Patent Application No. 2013-221626, filed on Oct. 24, 2013, the entire contents of which are incorporated herein by reference.

FIELD

The embodiment discussed herein is directed to a RAID (Redundant Arrays of Inexpensive Disks) configuration management device etc.

BACKGROUND

In a storage array device, it is not possible to access RAID consisting of disks in the same drive enclosure (DE) when, for example, a power failure occurs in the DE. In order to prevent this, in a storage array device, for example, RAID is configured across multiple DEs.

When new RAID is configured, the storage array device can be configured arbitrarily such that the RAID extend across multiple DEs. However, when the RAID configuration is changed after the operations start, the storage array device mounts a new disk on a destination to which the position of a disk of the RAID configuration is shifted and then performs processing of transferring data from the original disk to the new disk (logical device expansion).

Patent Document 1: Japanese Laid-open Patent Publication No. 2004-54806
Patent Document 2: Japanese Laid-open Patent Publication No. 2006-221526

However, changing the position of a disk of a RAID configuration has a problem in that the changing takes time in proportion to the data capacity of the disk to be shifted. In other words, in the conventional technology, after a new disk is mounted to a new destination to which the position is changed, the storage array device performs processing of transferring data from the original disk to the new disk, which takes time in proportion to the data capacity of the original disk.

The above-described problem occurs also in a case where the configuration is changed such that RAID extends across multiple DEs.

SUMMARY

According to another aspect of an embodiment, a RAID configuration management device manages a RAID configuration that is constituted by a plurality of drives. The RAID configuration management device includes a monitoring unit, a writing manager, a determination unit and an incorporating unit. The monitoring unit monitors unmount and mount of each drive of the RAID configuration. The writing manager manages a write request for writing data to a drive that is unmounted. The determination unit, when the monitoring unit detects mount of a drive of the RAID configuration, makes a determination on consistency of the data of the drive in which mount is detected on the basis of the write request that is managed by the writing manager. The incorporating unit, when the determination unit determines that the data lacks consistency, performs processing for recovering data expected to be written by the write request that is issued to the drive in which mount is detected while the drive is unmounted and incorporates the drive in an original RAID configuration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 represents a data structure of a RAID group information table according to the embodiment;
FIG. 4 represents a data structure of a DE/slot information table according to the embodiment;
FIG. 5 represents a data structure of a writing management information table according to the embodiment;
FIG. 12 represents each exemplary table in a case where a disk is unmounted (Method 1);
FIG. 13 represents each exemplary table in a case where a write request is issued while a disk is unmounted (Method 1);
FIG. 14 represents each exemplary table in a case where a disk is unmounted (Method 2);
FIG. 15 represents each exemplary table in a case where a write request is issued while a disk is unmounted (Method 2);
FIG. 16 represents each exemplary table in a case where a disk is unmounted (Method 3);
and
FIG. 17 represents each exemplary table in a case where a write request is issued while a disk is unmounted (Method 3).

DESCRIPTION OF EMBODIMENT(S)

Preferred embodiments of the present invention will be explained with reference to accompanying drawings. The embodiment does not limit the invention.

Figure 1:
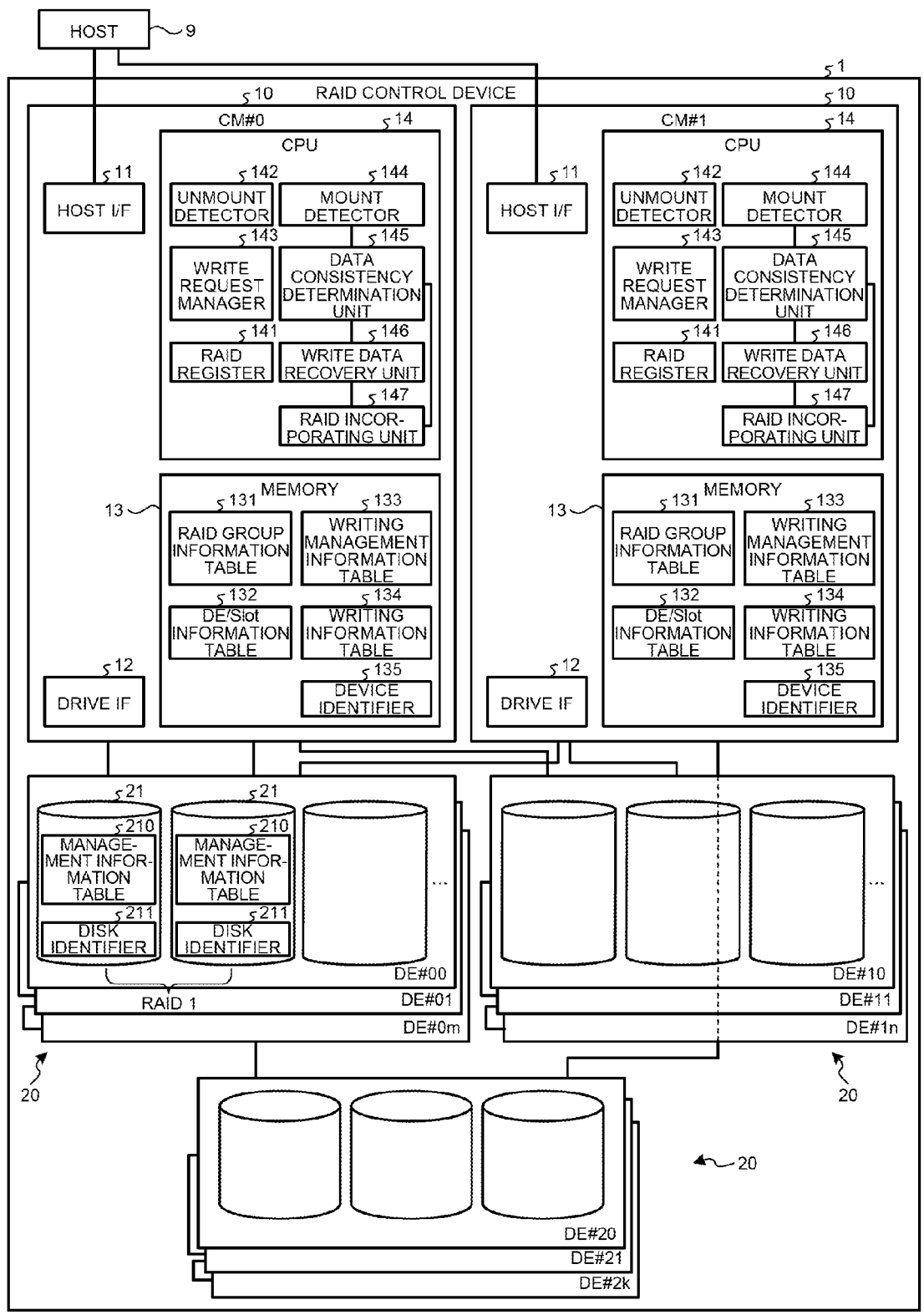
FIG. 1 illustrates an exemplary hardware configuration of a RAID control device according to an embodiment.

FIG. 1 illustrates an exemplary hardware configuration of a RAID control device according to the embodiment. As illustrated in FIG. 1, a RAID control device 1 is connected to a host 9. The RAID control device 1 includes multiple controller modules (CM) 10 and multiple drive enclosures (DE) 20. The multiple CMs 10 have redundancy. Each CM 10 includes a host I/F 11, a drive I/F 12, a memory 13, and a CPU 14. The host I/F 11 is connected to the host 9. The drive I/F 12 is connected to the multiple DEs 20. For example, the drive I/F 12 is connected to DE20 # at multiple levels (cascading connection). In the example illustrated in FIG. 1, a port 0 of the drive I/F 12 is connected to DE#00, DE#01, . . . DE#0m in multiple layers. A port 1 of the drive I/F 12 is connected to DE#10, DE#11, . . . DE#1n in multiple layers. A port 2 of the drive I/F 12 is connected to a DE#20, a DE#21, . . . a DE#2k in multiple layers. Multiple disks 21 are mounted on the DEs 20 and the drive I/F 12 is connected to the disks 21 in the DEs 20. The CM 10 is an example of a RAID configuration management device. The disk 21 is an HDD or an SDD and is an example of a drive that stores data.

The disks 21 in a DE 20 constitute different disks 21 and RAID in the same DE 20 or a different DE 20. In the embodiment, even when a disk 21 in a DE 20 constitutes RAID together with a disk 21 in the same DE 20, the position of the disk 21 constituting the RAID can be changed to a different DE 20 without stopping I/O to/from the host 9. In other words, the position of the disk 21 constituting the RAID is changed to a different DE 20 not by transferring data to a new disk 21 that is mounted on a new destination but by physically shifting the disk 21. Accordingly, in a case where there are multiple disks 21 constituting RAID, even if it is not possible to access the disks 21 in a DE 20 due to a power failure of the DE 20, it is possible to access the disk 21 in the different DE 20, which secures the data in the DE 20 during the power failure.

Figure 2:
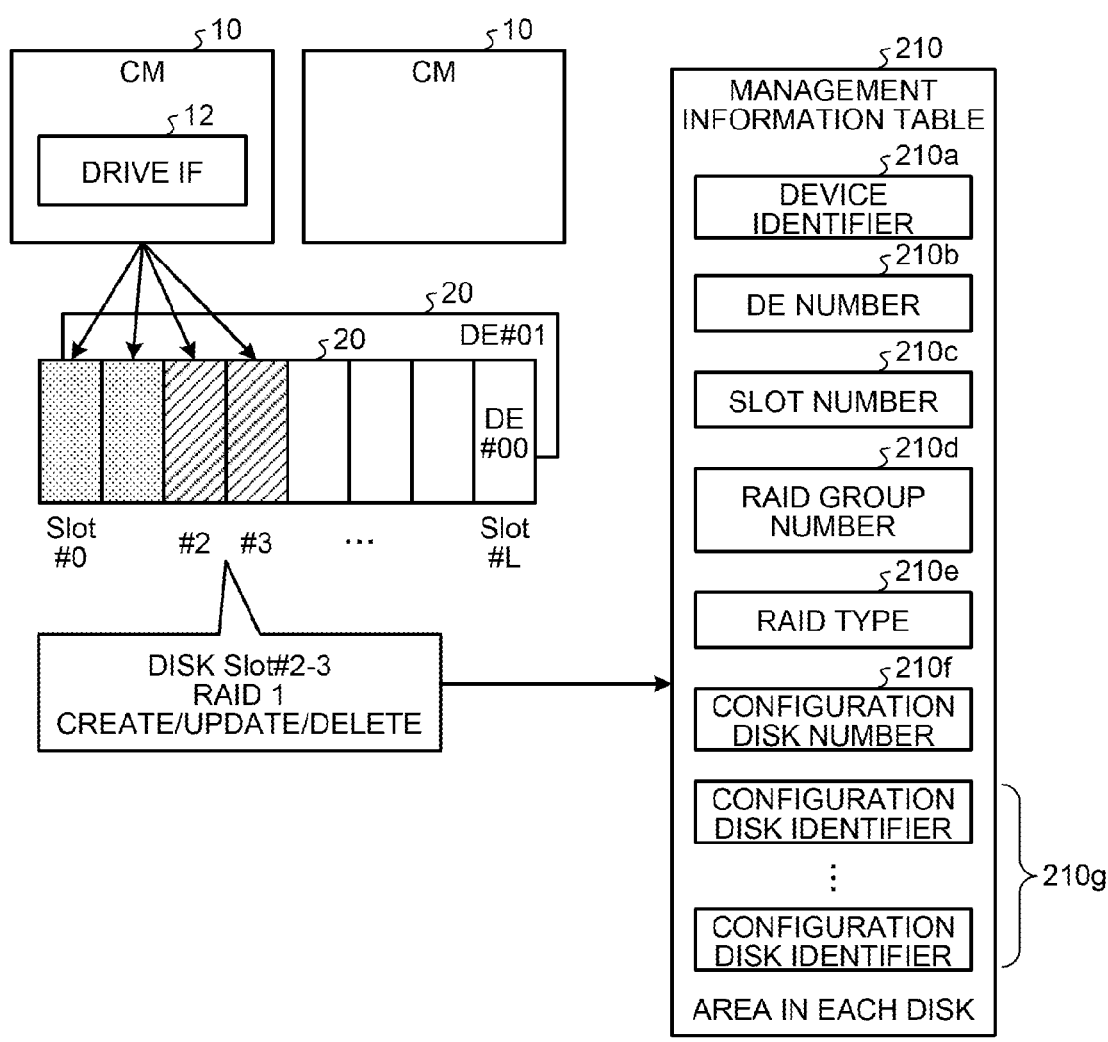
FIG. 2 illustrates a management information table in a disk.

A disk 21 stores a management information table 210 and a disk identifier 211. The management information table 210 contains information on a slot on which the disk 21 constituting RAID is mounted and identification information on the disk 21. The management information table 210 is stored in each area of each disk 21 constituting RAID. The disk identifier 211 stores in advance a unique device identifier of the disk 21. The management information table 210 in the disk 21 will be described with reference to FIG. 2. FIG. 2 illustrates a management information table in a disk. As illustrated in FIG. 2, in DE#00, the disk 21 mounted on Slot#2 and the disk 21 mounted on Slot#3 constitute RAID1.

As illustrated in FIG. 2, the disk 21 mounted on Slot#2 and the disk 21 mounted on Slot#3 store the management information table 210 in an area in each disk 21. The management information table 210 is stored in the disks 21 when a RAID register 141, which will be described below, registers RAID information.

The management information table 210 stores a device identifier 210a, a DE number 210b, a slot number 210c, a RAID group number 210d, a RAID type 210e, a configuration disk number 210f, and a configuration disk identifier 210g in association with one another. The device identifier 210a represents an identifier that identifies the RAID control device 1. The DE number 210b represents an identification number of the DE on which the disk 21 is mounted. The slot number 210c represents an identification number of the slot on which the disk 21 is mounted. The RAID group number 210d represents an identification number of the RAID group of disks 21 that constitute RAID. The RAID type 210e represents the type of RAID. The configuration disk number 210f represents the number of disks that constitute RAID. The configuration disk identifier 210g represents a unique device identifier of a disk 21 that constitutes the RAID. When multiple disks 21 constitute RAID, multiple unique device identifiers of the disks 21 are set for the configuration disk identifier 210g. The management information table 210 is not limited to the table format. A storing format other than table format may be employed. In other word, it is satisfactory if the content of management information is stored.

The following descriptions refer back to FIG. 1. The memory 13 includes a RAID group information table 131, a DE/slot information table 132, a writing management information table 133, a writing information table 134, and a device identifier 135. The device identifier 135 is stored in advance before shipping. The RAID group information table 131 stores information on the RAID group. The DE/slot information table 132 stores information on slots of each DE. In other words, the DE/slot information table 132 stores information on whether a disk is mounted on the slot, stores, if a disk is mounted on the disk, information on which identifier the disk has, and store, if a the disk is registered in the RAID group, writing-preceding timestamp/writing-completion timestamp, which will be described below. The writing management information table 133 manages the write requests from the host 9 in association with the management methods. The writing information table 134 stores the positions in each of which the data for which a write request is issued is managed in accordance with the management methods. The data structures of the RAID group information table 131, the DE/slot information table 132, the writing management information table 133, and the writing information table 134 will be described below. The RAID group information table 131, the DE/slot information table 132, the writing management information table 133, and the writing information table 134 are not limited to the table format. A storing format other than table format may be employed. In other words, it is satisfactory if the content of each type of information is stored. The memory 13 is an example of a storage unit.

The CPU 14 includes a RAID register 141, a unmount detector 142, a write request manager 143, a mount detector 144, a data consistency determination unit 145, a write data recovery unit 146, and a RAID incorporating unit 147. The unmount detector 142 and the mount detector 144 are an example of a monitoring unit. The write request manager 143 is an example of a writing manager. The data consistency determination unit 145 is an example of a determination unit. The write data recovery unit 146 and the RAID incorporating unit 147 are an example of an incorporating unit.

The RAID register 141 registers information that depends on the RAID configuration. For example, the RAID register 141 generates the RAID group information table 131 for a RAID configuration and generates the DE/slot information table 132 for a disk 21 of the RAID configuration. The RAID register 141 writes, to the disks 21, the management information table 210 for the disks 21 of the RAID configuration.

The data structure of the RAID group information table 131 will be described here with reference to FIG. 3. FIG. 3 represents a data structure of the RAID group information table according to the embodiment. As illustrated in FIG. 3, the RAID group information table 131 stores a RAID group number 131a, a RAID type 131b, a RAID state 131c, and a RAID configuration disk number 131d in association with one another. The RAID group information table 131 further stores RAID configuration disk position information 131e and in-use spare disk position information 131f in association with each other.

The RAID group number 131a represents a group number of RAID that is used by the RAID control device 1. The RAID type 131b represents a type of RAID and is equivalent to the RAID level. The RAID type 131b includes values representing, for example, RAID0, RAID1, RAID5, RAID6, RAID10, and RAID50. The RAID state 131c represents the state of RAID. The RAID state 131c includes "Available" indicating that a disk of the RAID configuration is normal, "Exposed" indicating that a disk in the RAID configuration is unmounted, "Broken" indicating that the RAID is broken. The RAID configuration disk number 131d represents the number of disks constituting the RAID group. The RAID configuration disk position information 131e represents the position information on the disks that constitute the RAID group. In the RAID configuration disk position information 131e, for example, are set the numbers of the DE and slot on which the disk 21 is mounted, which serve as information used to calculate DE/slot information from the DE/slot information table 132. For the in-use spare disk position information 131f, for example, are set a DE number and a slot number, which serve as information used to identify a spare disk in use.

For example, when the RAID group number 131a represents "0", "RAID1" is stored as the RAID type 131b, "Available" is stored as the RAID state 131c, and "2" is stored as the RAID configuration disk number 131d. Furthermore, "DE#00 Slot#00" and "DE#00 Slot#01" are stored as the RAID configuration disk position information 131e, and "-" indicating that there is no information, i.e., an invalid value, is stored as the in-use spare disk position information 131f.

The data structure of the DE/slot information table 132 will be described here with reference to FIG. 4. FIG. 4 represents a data structure of the DE/slot information table according to the embodiment. As represented in FIG. 4, the DE/slot information table 132 stores, a disk identifier 132c, a slot state 132d, a writing-preceding timestamp 132e, and a writing-completion timestamp 132f in association with a DE number 132a and a slot number 132b.

The DE number 132a and the slot number 132b represent the DE number and slot number of a disk 21 that is incorporated in the RAID configuration. The disk identifier 132c represents a unique device name of a disk 21 incorporated in the RAID configuration. The slot state 132d represents the state of the disk 21 that is mounted on the slot that is represented by the slot number 132b. The slot state 132d includes "Available" indicating that the disk 21 is in use, "Not Available" indicating that the disk 21 is out of use, and "Broken" indicating that the disk 21 is unmounted. When the disk 21 is a spare disk, the slot state 132d includes "Rebuild" indicating a state where data of the broken disk is rebuilt in a spare disk. The writing-preceding timestamp 132e represents a value of a timestamp that is set before the host 9 issues a write request to the disk 21. The writing-completion timestamp 132f represents a value of the timestamp that is set after the write request issued to the disk 21 is normally completed.

In an example, when the DE number 132a represents "0" and the slot number 132b represents "0", "300000E0DE00000F" is stored as the disk identifier 132c and "Available" is stored as the slot state 132d. "0x0000000010bf90e0" is stored as the writing-preceding timestamp 132e and "0x0000000010bf90e0" is stored as the writing-completion timestamp 132f.

The following descriptions refer back to FIG. 1. The unmount detector 142 detects unmount of a disk 21 of the RAID configuration. For example, upon detecting unmount of a disk 21, the unmount detector 142 acquires the position information on the detected disk 21 that is unmounted. The position information on the detected disk 21 that is unmounted represents the numbers of the DE and slot in which the disk 21 is unmounted. The unmount detector 142 refers to the RAID configuration disk position information 131e of the RAID group information table 131 and, when there is position information on the detected disk 21 that is unmounted, determines that the disk 21 is a disk that is incorporated in the RAID. The unmount detector 142 sets "Exposed" indicating that any disk 21 of the RAID configuration is unmounted is set for the RAID state 131c of the RAID group information table 131.

For the DE/slot information table 132, the unmount detector 142 sets "Broken" indicating that the disk 21 is unmounted for the slot state 132d corresponding to the position information on the detected disk 21 that is unmounted.

In the entry (writing management information) of the writing management information table 133, which will be described below, the unmount detector 142 makes a setting for the method of managing data in a case where a request for writing the data is issued while the disk 21 is unmounted. In the entry, the unmount detector 142 then makes a setting for the position information, RAID group number, RAID type, and unmount timestamp for the detected disk 21 that is unmounted.

The method of managing data in a case where a data write request is issued while a disk is unmounted will be described here. In Method 1, when there is a spare disk in the RAID group including a disk 21 in which unmount is detected and if a request for writing data is issued to the disk 21 while the disk 21 is unmounted, data is written to the spare disk and writing information used for data recovery is stored. The writing information includes the position information indicating the position in which write data is written to a normal disk 21 of the RAID and the size of the write data. Thereafter, in Method 1, when mount of the disk 21 is detected, a part to be written to the disk 21 is identified from the writing information and recovery processing is performed by using the data in the spare disk.

The Methods 2, 3 and 4 are methods of managing data in a case where there is no spare disk in the RAID group including the disk 21 in which unmount is detected. In Method 2, when a data write request is issued to the disk 21 while the disk 21 is unmounted, data is written to a buffer area that is secured in the memory 13 and writing information used for data recovery is stored. The writing information includes the position information indicating the position in which write data is written to a normal disk 21 of the RAID and the size of the write data. If a request for writing data beyond the secured area in the memory 13, the operation is switched to an operation of storing only writing information. Thereafter, in Method 2, when mount of the disk 21 is detected, the data in the buffer area secured in the memory 13 is written back to the disk 21. Furthermore, a part of the data beyond the buffer area, which is the part written to the disk 21, is identified and recovery processing is performed by using the redundant data in a normal disk 21 of the RAID.

In Method 3, when a request for writing data is issued to the disk 21 while the disk 21 is unmounted, writing information used for data recovery is stored without using a buffer secured in the memory. The writing information includes the position information indicating the position in which write data is written to a normal disk 21 of the RAID and the size of the write data. Thereafter, in Method 3, when mount of the disk 21 is detected, a part written to the disk 21 is identified from the writing information and recovery processing is performed by using the redundant data in a normal disk 21 of the RAID.

In Method 4, even if a request for writing data is issued to the disk 21 while the disk 21 is unmounted, the data expected to be written is not managed. In Method 4, when mount of the disk 21 is detected, the data in a normal disk 21 of the RAID is used to perform recovery processing on the whole disk 21 in which mount is detected.

The write request manager 143 manages the data write request to the unmounted disk 21.

For example, the write request manager 143 writes, regarding an unmounted disk 21 to which the host 9 issues a write request, a writing-preceding timestamp to the writing-preceding timestamp 132e of the DE/slot information table 132. The write request contains information that can identify the disk 21 in which the data is written, the position information representing the position in which the write data is written, and the write data.

The write request manager 143 determines, regarding the writing management information table 133, whether there is an entry corresponding to the disk 21 from among the entries of writing management information in each of which the validity flag indicates validity. For example, the write request manager 143 determines whether, from among the entries of writing management information of the writing management information table 133, there is an entry that matches the disk 21 in RAID group number, DE number, and slot number.

Upon determining that there is such an entry, the write request manager 143 performs the following processing. When an entry management method 133b represents "Method 1", the write request manager 143 writes data to a spare data and records writing information used for data recovery in the writing information table 134. The writing information includes position information representing the position in which the write data is written in a normal disk 21 of the RAID, and the size of the write data. When the entry management method 133b represents "Method 2", the write request manager 143 writes data to a buffer area secured in the memory and records writing information used for data recovery in the writing information table 134. The writing information includes the address of the buffer in the memory 13 in which data is written, position information representing the position in which the write data is written in a normal disk 21 of the RAID, and the size of the write data. When the entry management method 133b represents "Method 3", the write request manager 143 records writing information used for data recovery in the writing information table 134. The writing information includes the position information representing the position in which the write data is written in a normal disk 21 of the RAID and the size of the write data.

The write request manager 143 writes a timestamp following the completion of writing processing to the writing completion timestamp 132f in the DE/slot information table 132.

When a writing information number 133d represents a writing information upper limit number 133c or when a management period from a timestamp 133j at which the disk 21 is unmounted is exceeded, the write request manager 143 makes a setting such that a validity flag 133k of the management information indicates invalidity.

The data structure of the writing management information table 133 will be described here with reference to FIG. 5. FIG. 5 represents a data structure of the writing management information table according to the embodiment. As illustrated in FIG. 5, the writing management information table 133 stores a writing management sequence number 133a, the management method 133b, the writing information upper limit number 133c, the writing information number 133d, a memory buffer upper limit number 133e, and a data number 133f in association with one another. The writing management information table 133 further stores a RAID group number 133g, a RAID type 133h, disk-identifying information (DE number/slot number) 133i, unmount timestamp 133j, and the validity flag 133k in association with one another.

The writing management sequence number 133a represents a sequence number that identifies the writing management information, i.e., a serial number. The management method 133b represents a method of managing the data when a data write request is issued while the disk is mounted. For the management method 133b, for example, any one of Method 1, Method 2, Method 3, and Method 4 is set. The writing information upper limit number 133c represents an upper limit number of sets of writing information corresponding to the writing management sequence number 133a. The writing information number 133d represents the number of sets of valid (managed) writing information corresponding to the writing management sequence number 133a. The memory buffer upper limit number 133e represents the upper limit of the number of buffers that are secured in the memory 13 that are used for writing data. The data number 133f represents the number of valid (managed) memory buffers. The memory buffer upper limit number 133e and the data number 133f are used only in Method 2 using a memory buffer. The RAID group number 133g represents the number of the managed RAID group. The RAID type 133h represents the type of the managed RAID. The disk-identifying information 133i represents the DE number and slot number of the unmounted disk of the managed RAID. The unmount timestamp 133j represents the timestamp at which the disk 21 is unmounted. The unmount timestamp 133j is used when the write request manager 143 determines whether the management period is exceeded. The validity flag 133k represents whether the writing management information corresponding to the writing management sequence number 133a is valid.

Figure 6:
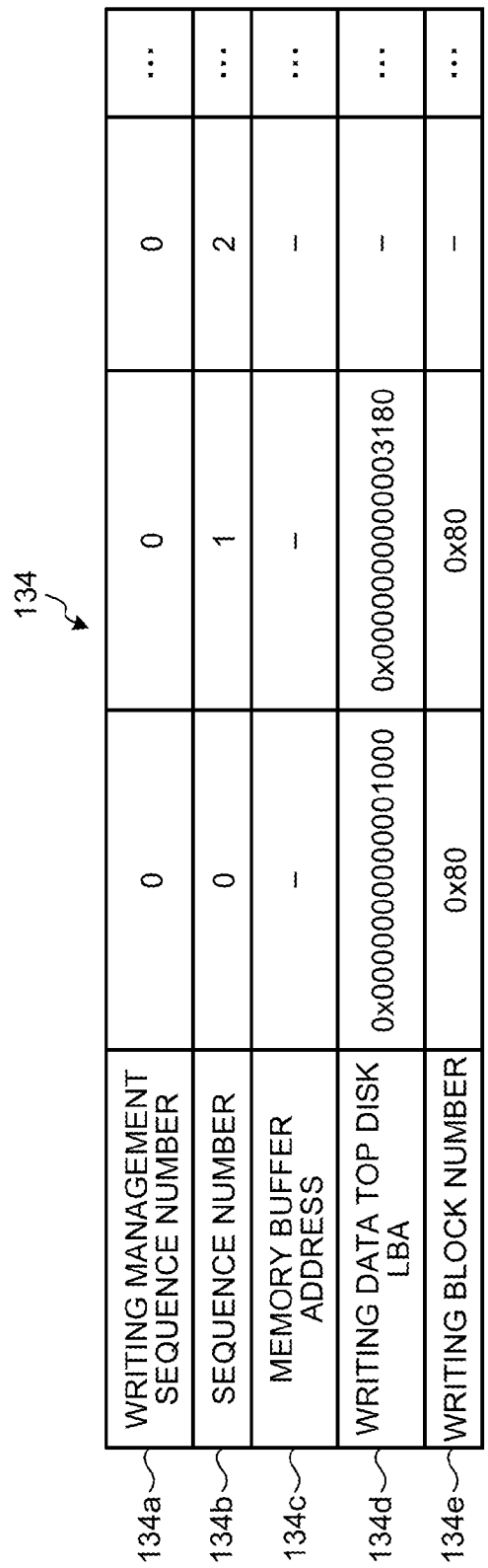
FIG. 6 represents a data structure of a writing information table according to the embodiment.

The data structure of the writing information table 134 will be described here with reference to FIG. 6. FIG. 6 represents a data structure of the writing information table according to the embodiment. As illustrated in FIG. 6, the writing information table 134 stores a writing management sequence number 134a, a sequence number 134b, a memory buffer address 134c, write data top disk LBA (Logical Block Addressing) 134d, and a writing block number 134e in association with one another. The writing management sequence number 134a is a sequence number that identifies the writing management information and corresponds to the writing management sequence number 133a of the writing management information table 133. The sequence number 134b is a sequence number corresponding to the writing management sequence number 134a and is, for example, a serial number. The memory buffer address 134c represents the address of the memory buffer in which the data is written. The write data top disk LBA 134d represents the position information on the position in which the write data is written in a normal disk 21 of the RAID. The writing block number 134e represents the size of the write data in the normal disk 21 of the RAID.

The following descriptions refer back to FIG. 1. The mount detector 144 detects mount of a disk 21 of the RAID configuration.

For example, upon detecting mount of a disk 21, the mount detector 144 reads the disk identifier 211 and the management information table 210 of the detected disk 21 that is mounted. The mount detector 144 then determines whether the device identifier 210a stored in the management information table 210 and the device identifier 135 in the memory 13 match. Upon determining that the device identifiers match, the mount detector 144 determines whether the disk 21 in which mount is detected is a disk of the RAID configuration. For example, the mount detector 144 performs determination processing by comparing the management information stored in the management information table 210 with various types of information stored in the RAID group information table 131 and the DE/slot information table 132. The details of the determination processing will be described below.

When the mount detector 144 determines mount of a disk 21 of the RAID configuration, the data consistency determination unit 145 makes a determination on consistency of data of the disk 21 in which mount is detected on the basis of the write requests managed by the write request manager 143.

For example, the data consistency determination unit 145 determines whether the timestamp preceding the issue of a write request to the disk 21 in which mount is detected and the timestamp following the completion of the write request. In other words, the data consistency determination unit 145 makes a determination on the data consistency by determining whether a write request is issued while the disk 21 in which mount is detected is unmounted. When the timestamps do not match, it is determined that a write request is issued while the disk 21 is unmounted and thus the data lacks consistency. When the timestamps match, it is determined that a write request is not issued while the disk 21 is unmounted and thus the data has consistency.

When the data consistency determination unit 145 determines that the data lacks consistency, the write data recovery unit 146 performs, on the disk 21 in which mount is detected, processing for recovering data expected to be written by the write request issued while the disk 21 is unmounted.

For example, the write data recovery unit 146 determines whether there is an entry of write management information for the disk 21 in which mount is detected. For example, the write data recovery unit 146 acquires, from the information that is stored in the RAID group information table 131 and the DE/slot information table 132, the DE number 132*a*, the slot number 132*b*, and the RAID group number 131*a* of the disk 21 in which mount is detected. The write data recovery unit 146 further acquires, from the write management information stored in the writing management information table 133, the information (DE number/slot number) 133*i* that identifies the disk in which mount is detected and the RAID group number 133*g*. The write data recovery unit 146 compares the acquired various types of information and determines whether they match. In other words, the write data recovery unit 146 determines whether there is an entry of write management information for the disk 21 in which mount is detected.

Upon determining that there is an entry of write management information for the disk 21 in which mount is detected, the write data recovery unit 146 performs recovery processing on the basis of the management method 133*b* stored in the entry. For example, when the management method 133*b* represents Method 1, the write data recovery unit 146 uses the information stored in the RAID group information table 131 to identify a spare disk corresponding to the RAID group number. The write data recovery unit 146 uses the writing information corresponding to the entry of writing management information to write back the data from the identified spare disk to the disk 21. When the management method 133*b* represents Method 2, the write data recovery unit 146 uses the writing information corresponding to the entry of writing management information and, if the data is stored in a memory buffer, writes beck the data from the memory buffer to the disk 21. Even when the management method 133*b* represents Method 2, the write data recovery unit 146 uses the writing information corresponding to the entry of writing management information to write back the data exceeding the memory buffer upper limit number 133*e* from a normal disk 21 of the RAID to the disk 21. When the management method 133*b* represents Method 3, the write data recovery unit 146 uses writing information corresponding to the entry of writing management information to write back the data from a normal disk 21 of the RAID to the disk 21.

The write data recovery unit 146 makes a setting such that the validity flag 133*k* corresponding to the writing management sequence number 133*a* indicates that the writing management information is invalid. When the data consistency determination unit 145 determines that the data has consistency, the write data recovery unit 146 does not perform the data recovery processing on the disk 21 in which mount is detected.

The RAID incorporating unit 147 incorporates the disk 21 in which mount is detected in the original RAID configuration. For example, when the data of the disk 21 in which mount is detected lacks consistency and if data is recovered, the RAID incorporating unit 147 changes the numbers of the DE and slot in which the disk 21 is unmounted to the numbers of the DE and slot on which the disk 21 is mounted. When the data of the disk 21 in which mount is detected has consistency, the RAID incorporating unit 147 changes the numbers of the DE and slot in which the disk 21 is unmounted to the numbers of the DE and slot in which the disk 21 is mounted. For example, the RAID incorporating unit 147 changes the RAID configuration disk position information 131*e* in the RAID group information table 131 to the numbers of the DE and slot in which the disk 21 is mounted. The RAID incorporating unit 147 deletes the DE/slot information corresponding to the numbers of the DE and slot in which the disk 21 is unmounted from the DE/slot information table 132 and registers DE/slot information corresponding to the numbers of the DE and slot in which the disk 21 is unmounted. The RAID incorporating unit 147 changes the DE number and slot number stored in the management information table 210 in the disk 21 in which mount is detected to the numbers of the DE and slot in which the disk 21 is mounted.

Flowchart of RAID Registration Processing

Figure 7:
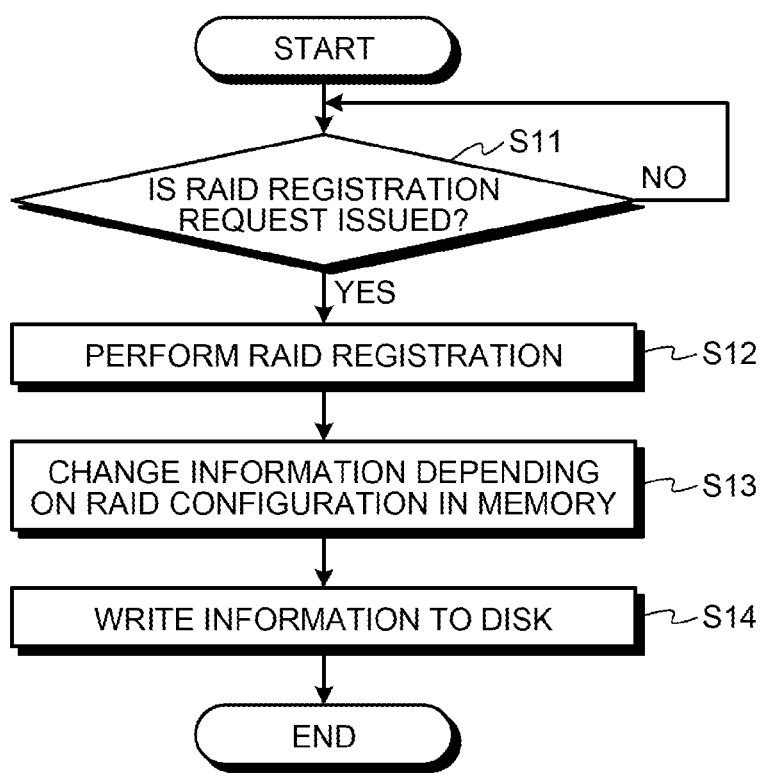
FIG. 7 is a flowchart of RAID registration processing.

A flowchart of the RAID registration processing will be described with reference to FIG. 7. FIG. 7 is a flowchart of RAID registration processing.

The RAID register 141 determines whether a RAID registration request is issued (step S11). Upon determining that a RAID registration request is not issued (NO at step S11), the RAID register 141 repeats determination processing until a RAID registration request is issued.

In contrast, upon determining that a RAID registration request is issued (Yes at step S11), the RAID register 141 performs RAID registration (step S12). For example, by using a graphical user interface (GUI), the RAID register 141 acquires the number of disks 21 that constitute RAID, the identifiers of the disks 21 and the position information (DE number and slot number) on the disks 21. The RAID register 141 records the acquired various types of information in the RAID group information table 131 and the DE/slot information table 132.

The RAID register 141 changes the information that depends on the RAID configuration in the memory 13 (step S13). For example, by using the GUI, the RAID register 141 acquires information that depends on the RAID configuration, e.g. the RAID type and, if there is a spare disk, the position information on the spare disk. The RAID register 141 records the information in the RAID group information table 131 and the DE/slot information table 132 in the memory 13.

The RAID register 141 then writes information to each disk 21 (step S14). For example, by using the GUI, the RAID register 141 writes, to the multiple disks 21 that are linked as the RAID configuration, the management information tables 210 corresponding to the disks 21. The RAID register 141 then ends the RAID registration processing.

Flowchart of Unmount Detection Processing

Figure 8:
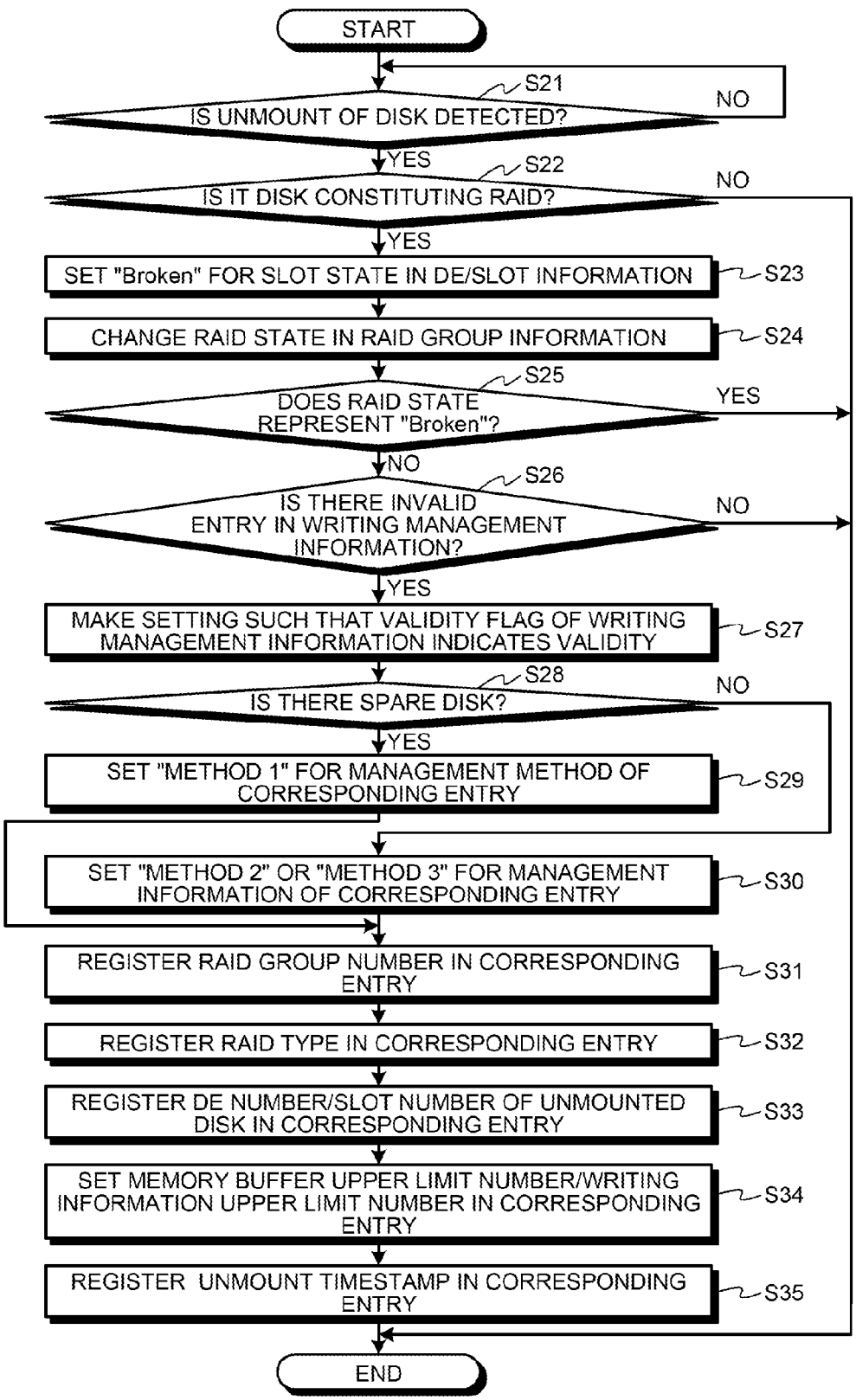
FIG. 8 is a flowchart of unmount detection processing.

A flowchart of the unmount detection processing will be described with reference to FIG. 8. FIG. 8 is a flowchart of the unmount detection processing. It is supposed that the RAID register 141 has completed the RID registration processing.

The unmount detector 142 determines whether unmount of a disk 21 is detected (step S21). Upon determining that unmount of the disk 21 is not detected (NO at step S21), the unmount detector 142 repeats the determination processing until unmount of a disk 21 is detected.

Upon determining that unmount of a disk 21 is detected (YES at step S21), the unmount detector 142 determines whether the disk 21 in which unmount is detected is a disk constituting RAID (step S22). For example, the unmount detector 142 acquires position information on the disk 21 in which unmount is detected. The position information represents the DE number and the slot number. The unmount detector 142 refers to the RAID configuration disk position information 131e in the RAID group information table 131 and, if there is acquired position information, determines that the disk 21 is a disk constituting the RAID. In contrast, when there is not acquired position information, the unmount detector 142 determines that the disk 21 is not a disk constituting the RAID.

Upon determining that the disk 21 in which unmount is detected is not a disk constituting the RAID (NO at step S22), the unmount detector 142 ends the unmount detection processing. In contrast, upon determining that the disk 21 in which unmount is detected is a disk constituting the RAID configuration (YES at step S22), the unmount detector 142 performs the following processing. The unmount detector 142 sets "Broken" indicating that the disk 21 is unmounted for the slot state 132d of the DE/slot information in the DE/slot information table 132 (step S23).

The unmount detector 142 changes the RAID state 131c in the RAID group information of the RAID group information table 131 to "Exposed" indicating that any one of the disks 21 of the RAID configuration is unmounted (step S24). For example, it is supposed that the CPU 14 includes a monitoring unit (not illustrated) that determines whether the RAID has an abnormality. When the RAID where a disk 21 is a constituent has an abnormality while the disk 21 is unmounted, the monitoring unit sets "Broken" indicating that the RAID is broken for the RAID state 131c in the RAID group information.

The unmount detector 142 then determines whether the RAID state 131c represents "Broken" indicating that the RAID is broken (step S25). Upon determining that the RAID state 131c represents "Broken" (YES at step S25), the unmount detector 142 ends the unmount detection processing. In contrast, upon determining that the RAID state 131c does not represent "Broken" (NO at step S25), the unmount detector 142 determines whether there is an invalid entry in the writing management information of the writing management information table 133 (step S26).

Upon detecting that there is not any invalid entry in the writing management information (NO at step S26), the unmount detector 142 ends the unmount detection processing. In contrast, upon detecting that there is an invalid entry in the writing management information (YES at step S26), the unmount detector 142 makes a setting such that the validity flag 133k of the writing management information indicates that the writing management information is valid (step S27).

The unmount detector 142 then determines whether there is a spare disk (step S28). For example, the unmount detector 142 refers to the in-use spare disk position information 131f corresponding to the disk 21 in which unmount is detected in the RAID group information table 131 and determines whether there is a spare disk.

Upon determining that there is a spare disk (YES at step S28), the unmount detector 142 sets "Method 1" for the management method 133b of the corresponding entry of writing management information (step S29). In contrast, upon determining that there is not any spare disk (NO at step S28), the unmount detector 142 sets "Method 2" or "Method 3" for the management method 133b of the corresponding entry of writing management information (step S30). For example, the unmount detector 142 can set "Method 2" to finish recovery processing soon. The unmount detector 142 can set "Method 3" to reduce the use of the memory 13.

The unmount detector 142 registers the RAID group number 133g of the corresponding entry (step S31). For example, the unmount detector 142 reads the RAID group number 131a corresponding to the disk 21 in which unmount is detected from the RAID group information table 131 and sets the RAID group number 131a for the RAID group number 133g of the corresponding entry.

The unmount detector 142 registers the RAID type 133h of the corresponding entry (step S32). For example, the unmount detector 142 reads the RAID type 131b corresponding to the disk 21 in which unmount is detected from the RAID group information table 131 and sets the RAID type 131b for the RAID type 133h of the corresponding entry.

The unmount detector 142 registers the DE number/slot number of the unmounted disk 21 in the corresponding entry (step S33). For example, the unmount detector 142 sets the position information on the disk 21 in which unmount is detected for the disk-identifying information 133i. The position information represents the DE number and slot number.

The unmount detector 142 then sets a memory buffer upper limit number and a writing information upper limit number in the corresponding entry (step S34). For example, the unmount detector 142 sets a predetermined memory buffer upper limit number for the memory buffer upper limit number 133e of the corresponding entry. The unmount detector 142 sets a predetermined writing information upper limit number for the writing information upper limit number 133c in the corresponding entry.

The unmount detector 142 then registers an unmount timestamp in the corresponding entry (step S35). For example, the unmount detector 142 sets a timestamp at which unmount of the disk 21 is detected for the unmount timestamp 133j in the corresponding entry. The unmount detector 142 then ends the unmount detection processing.

Flowchart of Write Request Management Processing

Figure 9:
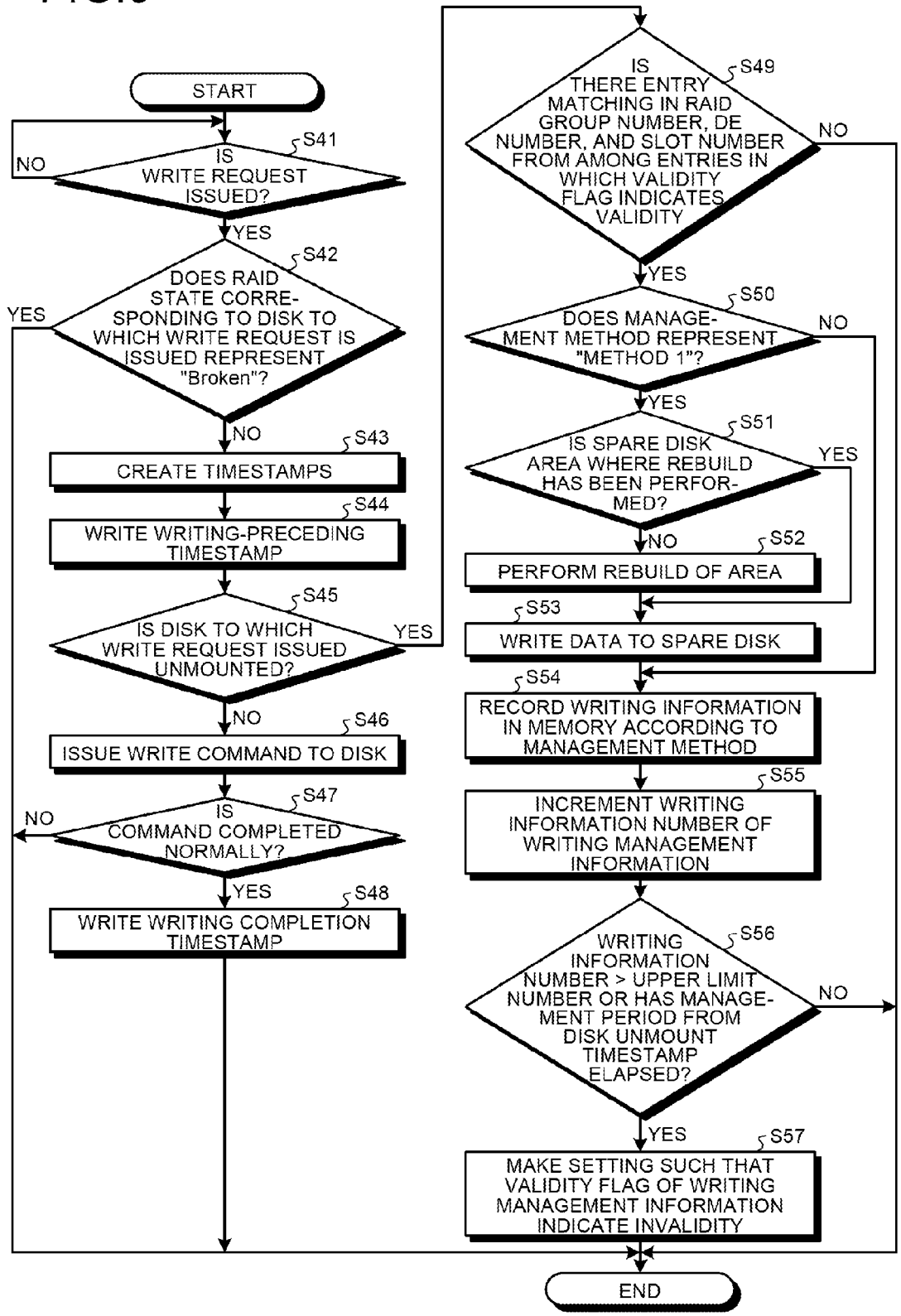
FIG. 9 is a flowchart of write request management processing.

A flowchart of write request management processing will be described here with reference to FIG. 9. FIG. 9 is a flowchart of the write request processing. It is supposed that the RAID register 141 has completed the RAID registration processing.

The write request manager 143 first determines whether a write request is issued (step S41). Upon determining that not any write request is issued (NO at step S41), the write request manager 143 repeats the determination processing until a write request is issued. In contrast, upon determining that a write request is issued (YES at step S41), the write request manager 143 determines, regarding the disk 21 for which the write request is issued, whether the RAID state represents "Broken" indicating an abnormality (step S42). It is satisfactory if the write request manager 143 acquires the RAID state as follows. For example, by using, as a key, the identifier of the disk 21 to which the write request is issued, the write request manager 143 acquires the corresponding DE number and slot number from the DE/slot information table 132. The write request manager 143 acquires, from the RAID group information table 131, the RAID state 131c of the RAID regarding which the acquired DE number and slot number serve as the position information on the disk.

Upon determining that the RAID state represents "Broken" (YES at step S42), the write request manager 143 ends the write request management processing. In contrast, upon determining that the RAID state does not represent "Broken" (NO at step S42), the write request manager 143 creates timestamps (step S43). For example, the write request manager 143 sets initial values for the writing-preceding timestamp 132e and the writing-completion timestamp 132f corresponding to the disk 21 for which the write request is issued.

The write request manager 143 writes, as a writing-preceding timestamp, the current timestamp to the writing-preceding timestamp 132e corresponding to the disk 21 for which the write request is issued (step S44). The write request manager 143 then determines whether the disk 21 for which the write request is issued is an unmounted disk (step S45). For example, the write request manager 143 refers to the slot state 132d corresponding to the disk 21 to which the write request is issued and then determines whether "Broken" indicating that the disk 21 is unmounted is represented.

Upon determining that the disk 21 is an unmounted disk (YES at step S45), the write request manager 143 performs the following processing. The write request manager 143 determines whether, from among the entries in which the validity flag 133k indicates that the writing management information is valid, there is an entry that matches the disk 21 in RAID group number, DE number, and slot number (step S49). Upon determining that there is not a corresponding entry (NO at step S49), the write request manager 143 ends the write request management processing.

Upon determining that there is a corresponding entry (YES at step S49), the write request manager 143 determines whether the management method 133b in the corresponding entry represents "Method 1" (step S50). Upon determining that the management method 133b of the corresponding entry represents "Method 1" (YES at step S50), the write request manager 143 determines whether the spare disk is an area where a rebuild has been performed (step S51).

Upon determining that the spare disk is not an area where a rebuild has been performed (NO at step S51), the write request manager 143 performs a rebuild of the area (step S52) and moves to step S53. In contrast, upon determining that the spare disk is an area where a rebuild has been performed (YES at step S51), the write request manager 143 moves to step S53. At step S53, the write request manager 143 writes the data expected to be written to the spare disk (step S53). The write request manager 143 moves to step S54.

In contest, upon determining that the management method 133b does not represent "Method 1" (NO at step S50), the write request manager 143 moves to step S54.

At step S54, the write request manager 143 records, in the memory 13, the writing information in the writing information table 134 in accordance with the management method of the corresponding entry (step S54).

The write request manager 143 increments the writing information number 133d of the corresponding writing management information (step S55). The write request manager 143 then determines whether the writing information number 133d of the corresponding writing management information exceeds the upper limit value or the management period has elapsed from the disk unmount timestamp 133j (step S56).

Upon determining that the writing information number 133d of the corresponding writing management information exceeds the upper limit value or the management period has elapsed from the disk unmount timestamp 133j (YES at step S56), the write request manager 143 performs the following processing. The write request manager 143 makes a setting such that the validity flag 133k indicates that the writing management information is invalid (step S57). The write request manager 143 then ends the write request management processing.

In contrast, upon determining that the writing information number 133d of the corresponding writing management information does not exceed the upper limit value and the management period from the disk unmount timestamp 133j has not elapsed (NO at step S56), the write request manager 143 ends the write request management processing.

Upon determining at step S45 that the disk 21 to which the write request is issued is not an unmounted disk (NO at step S45), the write request manager 143 performs the following process. The write request manager 143 issues a write request command to a disk 21 whose DE number and slot number correspond to those of the disk 21 to which the write request is issued (step S46). The write request manager 143 then determines whether the write request command is normally completed (step S47). Upon determining that the write request command is not normally completed (NO at step S47), the write request manager 143 ends the write request management processing.

In contrast, upon determining that the write request command is normally completed (YES at step S47), the write request manager 143 performs the following processing. The write request manager 143 writes the current timestamp as a writing processing completion timestamp in the writing-completion timestamp 132f (step S48). The write request manager 143 then ends the write request management processing.

Flowchart of Mount Detection Processing

Figure 10:
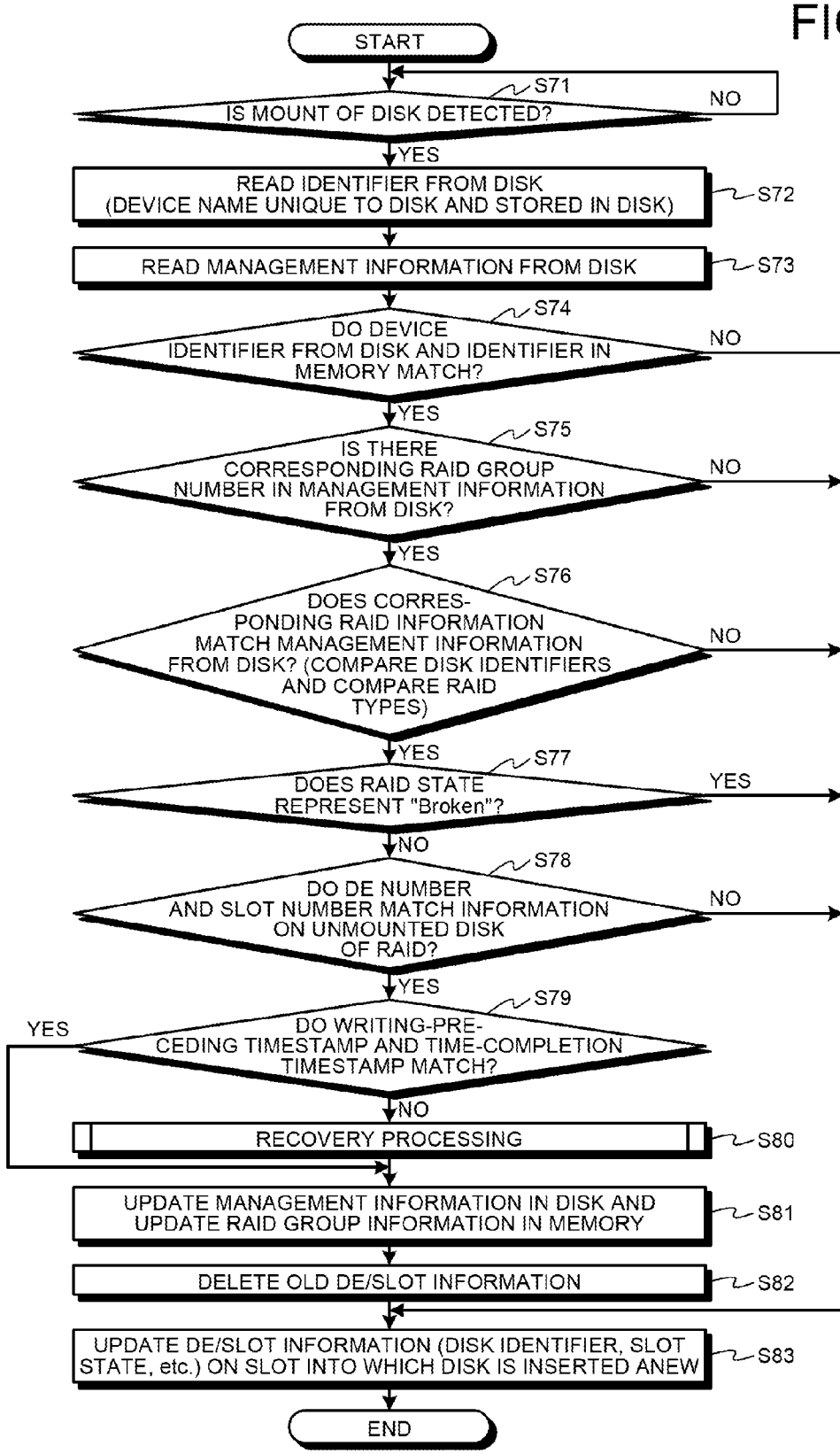
FIG. 10 is a flowchart of mount detection processing.

A flowchart of mount detection processing will be described here with reference to FIG. 10. FIG. 10 is a flowchart of the mount detection processing. It is supposed that the RAID register 141 has completed the RAID registration processing.

The mount detector 144 first determines whether mount of a disk 21 is detected (step S71). Upon determining that mount of a disk 21 is not detected (NO at step S71), the mount detector 144 repeats the determination processing until mount of a disk 21 is detected.

Upon determining that mount of a disk 21 is detected (YES at step S71), the mount detector 144 then reads the disk identifier 211 from the disk 21 in which mount is detected (step S72). The disk identifier 211 represents a device name unique to the disk 21 and stored in the disk 21.

The mount detector 144 then reads the management information table 210 from the disk 21 (step S73).

The mount detector 144 then determines whether the device identifier from the disk 21 and the device identifier in the memory 13 match (step S74). For example, the mount detector 144 determines whether the device identifier 210*a* in the management information table 210 read from the disk 21 and the device identifier 135 in the memory 13 match. Upon determining that the device identifier from the disk 21 and the device identifier in the memory 13 do not match (NO at step S74), the mount detector 144 moves to step S83 in order to update the information on the disk 21 that is inserted anew.

Upon determining that the device identifier from the disk 21 and the device identifier in the memory 13 match (YES at step S74), the mount detector 144 determines whether there is a corresponding RAID group number in the management information from the disk 21 (step S75). For example, the mount detector 144 determines whether the RAID group number 210*d* is set in the management information table 210 read from the disk 21. Upon determining that there is not any corresponding RAID group number (NO at step S75), the mount detector 144 moves to step S83 in order to update the information on the disk 21 inserted anew.

In contrast, upon determining that there is a corresponding RAID group number (YES at step S75), the mount detector 144 determines whether information on the RAID matches the management information from the disk 21 (step S76). For example, by using the disk identifier 211 read from the disk 21, the mount detector 144 reads the DE/slot information from the DE/slot information table 132. The mount detector 144 then reads, from the RAID group information table 131, the RAID group information corresponding to the read DE/slot information. The mount detector 144 then compares the RAID type 131*b* in the read RAID group information and the RAID type 210*e* in the management information table 210.

Upon determining that the information on the RAID does not match the management information from the disk 21 (NO at step S76), the mount detector 144 moves to step S83 in order to update the information on the disk 21 inserted anew. In contrast, upon determining that the information on the RAID matches the management information from the disk 21 (YES at step S76), the mount detector 144 determines whether the RAID state of the RAID group information represents "Broken" indicating an abnormality (step S77). Upon determining that the RAID state of the RAID group information represents "Broken" (YES at step S77), the mount detector 144 moves to step S83 in order to update the information on the disk 21 inserted anew.

In contrast, upon determining that the RAID state of the RAID group information does not represent "Broken" (NO at step S77), the mount detector 144 performs the following processing. The mount detector 144 determines whether the DE number and slot number that are read from the disk 21 match the information on the unmounted disk 21 of the RAID (step S78). For example, the mount detector 144 compares the DE number 210*b* and the slot number 210*c* in the management information table 210 with the DE number 132*a* and the slot number 132*b* corresponding to the DE/slot information that is read by using the disk identifier 211 as a key.

Upon determining that the DE numbers do not match and the slot numbers do not match (NO at step S78), the mount detector 144 determines that the information is not the information on the unmounted disk 21 of the RAID and moves to step S83 in order to update the information on the disk 21 inserted anew. In contrast, when it is determined that the DE number and slot number match the information on the unmounted disk 21 of the RAID (YES at step S78), the data consistency determination unit 145 determines whether the writing-preceding timestamp and writing-completion timestamp of the corresponding slot match (step S79). For example, the data consistency determination unit 145 compares the writing-preceding timestamp 132*e* and writing-completion timestamp 132*f* that correspond to the DE/slot information that is read by using the disk identifier 211 as a key.

Upon determining that the writing-preceding timestamp 132*e* and writing-completion timestamp 132*f* of the corresponding slot match (YES at step S79), the data consistency determination unit 145 determines that the data has consistency and thus goes to step S81. In contrast, upon determining that the writing-preceding timestamp 132*e* and writing-completion timestamp 132*f* of the corresponding slot do not match (NO at step S79), the data consistency determination unit 145 determines that the data does not have consistency and thus performs recovery processing (step S80). For example, the data consistency determination unit 145 passes the RAID group number of the RAID group information and the DE number and slot number of the DE/slot information as parameters to the write data recovery unit 146. After performing the recovery processing, the data consistency determination unit 145 moves to step S81.

At step S81, the RAID incorporating unit 147 updates the management information in the disk 21 and updates the RAID group information in the memory 13 (step S81). For example, the RAID incorporating unit 147 updates the DE number 210*b* and the slot number 210*c* in the management information table 210 in the disk 21 to the numbers of the DE and slot into which the disk 21 is inserted anew. In other words, the RAID incorporating unit 147 changes the numbers of the DE and slot in which the disk 21 is unmounted to the numbers of the DE and slot on which the disk 21 is mounted. The RAID incorporating unit 147 then updates the RAID configuration disk position information 131*e* of the corresponding RAID group information in the memory 13 from the numbers of the DE and slot in which the disk 21 is unmounted to the numbers of the DE and slot into which the disk 21 is inserted anew.

The RAID incorporating unit 147 then deletes the DE/slot information corresponding to the old DE number and slot number of the disk 21 from the DE/slot information table 132 (step S82). In other words, the RAID incorporating unit 147 deletes the DE/slot information corresponding to the numbers of the DE and slot in which the disk 21 inserted anew is previously unmounted.

The RAID incorporating unit 147 updates the DE/slot information on the slot into which the disk 21 is inserted anew (step S83). For example, the RAID incorporating unit 147 sets the DE number and slot number corresponding to the slot into which the disk 21 is inserted anew for the DE number 132*a* and the slot number 132*b*. The RAID incorporating unit 147 sets the disk identifier 211 in the disk 21 for the disk identifier 132*c*. The RAID incorporating unit 147 sets "Available" indicating that the slot is in use for the slot state 132*d*. The RAID incorporating unit 147 then ends the mount detection processing.

Flowchart of Recovery Processing

Figure 11:
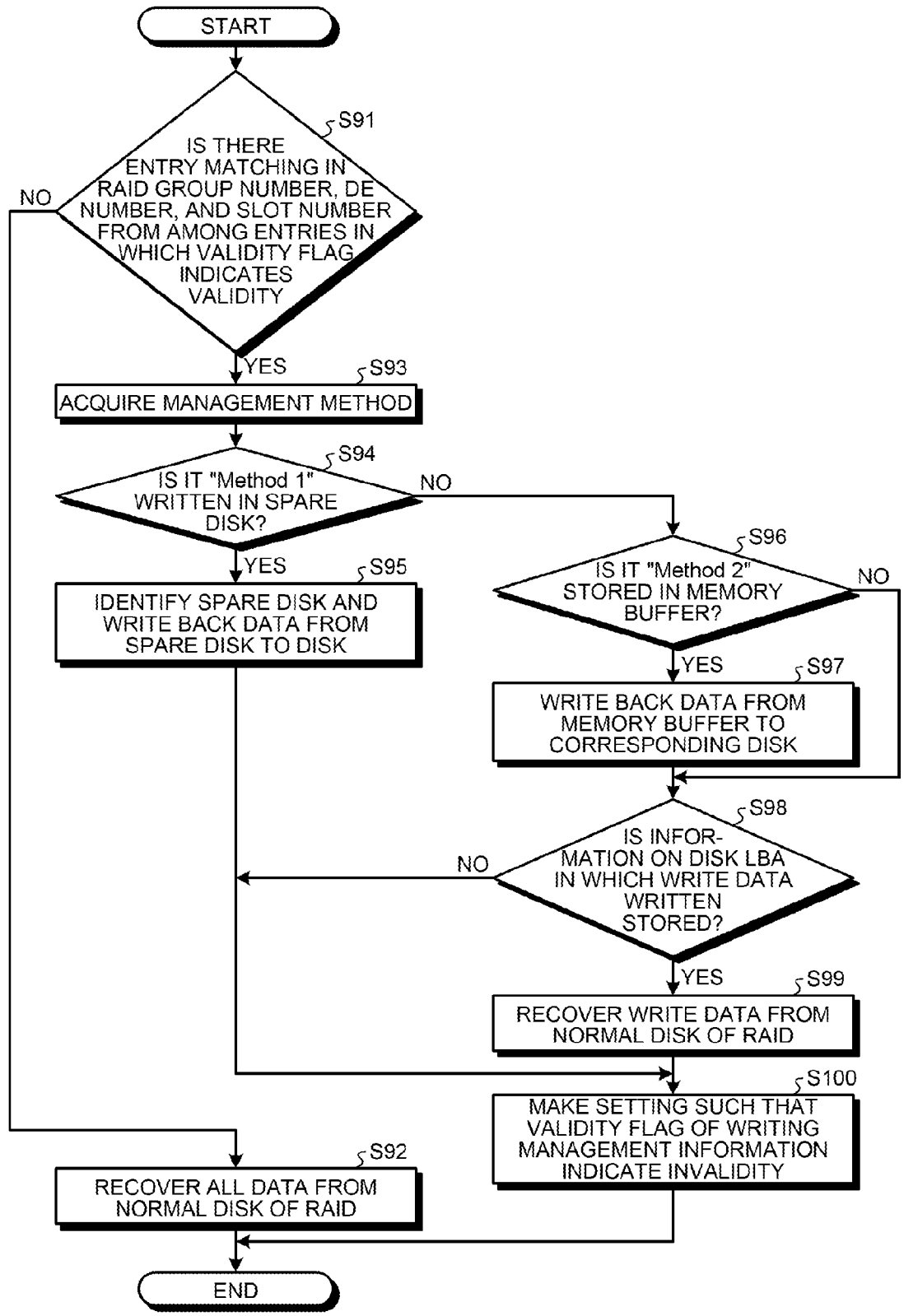
FIG. 11 is a flowchart of recovery processing.

A flowchart of recovery processing at step S80 of the mount detection processing S80 will be described here with reference to FIG. 11. FIG. 11 is a flowchart of the recovery processing. It is supposed that the data consistency determination unit 145 has passes the RAID group number, DE number, and slot number as parameters.

The write data recovery unit 146 determines whether, from among the entries in which the validity flag of the writing management information indicates that the writing management information is valid, there is an entry that matches the RAID group number, DE number, and slot number that are passed as parameters (step S91). Upon determining that there is not any corresponding entry (NO at step S91), because there is not any corresponding entry of writing management information, the write data recovery unit 146 recovers all data from a normal disk 21 of the RAID to the corresponding disk 21 (step S92). The write data recovery unit 146 then ends the recovery processing.

In contrast, upon determining that there is a corresponding entry (YES at step S91), the write data recovery unit 146 acquires a method of managing write data (step S93). For example, the write data recovery unit 146 acquires the management method 133b from the writing management information corresponding to the DE number and the slot number that are parameters.

The write data recovery unit 146 then determines whether the acquired management method represents "Method 1" in which write data is written to a spare disk (step S94). Upon determining that the acquired management method represents "Method 1" (YES at step S94), the write data recovery unit 146 identifies the spare disk and partially writes back the data from the spare disk to the disk 21 (step S95). The write data recovery unit 146 then moves to step S100.

Upon determining that the acquired management method does not represent "Method 1" (NO at step S94), the write data recovery unit 146 determines whether the acquired management method represents "Method 2" in which write data is stored in a memory buffer (step S96). Upon determining that the acquired management method represents "Method 2" in which write data is stored in a memory buffer (YES at step S96), the write data recovery unit 146 performs the following processing. The write data recovery unit 146 writes back the write data from the memory buffer to the corresponding disk 21 on the basis of the memory buffer address 134c liked from the write management information (step S97).

In contrast, upon determining that the acquired management method does not represent "Method 2" in which write data is stored in a memory buffer (NO at step S96), the write data recovery unit 146 performs the following processing. The write data recovery unit 146 determines whether information on the disk LBA in which the write data is written is stored in the writing information liked from the writing management information (step S98). Upon determining that the information on the disk LBA is stored in the writing information (YES at step S98), the write data recovery unit 146 uses the stored information to recover the write data from a normal disk 21 of the RAID to the corresponding disk 21 (step S99). The write data recovery unit 146 then moves to step S100.

In contrast, upon determining that the information on the disk LBA is not stored in the writing information (NO at step S98), the write data recovery unit 146 moves to step S100. At step S100, the write data recovery unit 146 makes a setting such that the validity flag 133k of the writing management information indicates that the writing management information is invalid (step S100). The write data recovery unit 146 then ends the recovery processing.

Exemplary Tables in a Case where a Disk is Unmounted (Method 1)

Each exemplary table in a case where a disk 21 is unmounted and a case where a write request is issued to the disk 21 while the disk 21 is unmounted will be described with reference to FIGS. 12 to 17. A disk 21 is mounted on each of Slot#00, Slot#01 and Slot#02 of DE#01 of the DE 20, constituting RAID 5. The disk 21 mounted on Slot#2 of DE#01 is unmounted and the disk 21 is shifted to Slot#2 of DE#00.

FIG. 12 represents each exemplary table in a case where a disk 21 is unmounted (Method 1). As illustrated in FIG. 12, in the RAID group information table 131, "Exposed" indicating that any one of the disks 21 of the RAID configuration is unmounted is set. In other words, the unmount detector 142 detects unmount of a disk 21 that is mounted on DE#01 and Slot#02. The unmount detector 142 then sets "Exposed" for the RAID state 131c of the RAID group information table 131. In the RAID group information table 131, "DE#01 Slot#11" is set for the in-use spare disk position information 131f. In other words, there is a spare disk in the RAID group.

In the DE/slot information table 132, "Broken" indicating that a disk 21 is unmounted is set for the slot state 132d corresponding to Slot#02 of DE#01 in which unmount of a disk 21 is detected. In other words, the unmount detector 142 sets "Broken" for the DE/slot information table 132 corresponding to the position information on the detected disk 21 that is unmounted.

In the writing management information table 133, "Method 1" is set for the management method 133b. In other words, because the position information on the spare disk is set for the in-use spare disk position information 131f corresponding to Slot#02 of DE#01, the unmount detector 142 sets "Method 1" for the writing management information management method 133b. In the writing management information, the unmount detector 142 sets "1" for the RAID group number 133g, sets "RAID5" for the RAID type 133h, and sets "DE#01 Slot#2" for the disk-identifying information 133i. Furthermore, the unmount detector 142 sets "0x0 . . . 010bf8f60" for the unmount timestamp 133j in the writing management information.

Exemplary tables in a case where write request is issued while disk is unmounted (Method 1)

FIG. 13 represents each exemplary table in a case where a write request is issued while a disk 21 is unmounted (Method 1). As illustrated in FIG. 13, in the DE/slot information table 132, the writing-preceding timestamp 132e and the writing-completion timestamp 132f are set. In other words, the write request manager 143 writes the current timestamp as a writing-preceding timestamp in the writing-preceding timestamp 132e. After the processing corresponding to the write request is completed, the write request manager 143 writes the current timestamp as a writing-completion timestamp in the writing-completion timestamp 132f. In other words, the writing-preceding timestamp 132e and the writing-completion timestamp 132f are different from each other.

If a write request is issued to the disk 21 twice, "2" is set for the writing information number 133d. When the writing management sequence number 134a represents "0" and the sequence number 134b represents "0", "0x0 . . . 01000" is set for the write data top disk LBA 134d and "0x80" is set for the writing block number 134e in the writing information table 134. When the writing management sequence number 134a represents "0" and the sequence number 134b represents "1", "0x0 . . . 03180" is set for the write data top disk LBA 134*d* and "0x80" is set for the writing block number 134*e*. In other words, because the management method 133*b* represents "Method 1", the write request manager 143 writes data to the spare disk and records the position information representing the position in which the write data is written to a normal disk 21 of the RAID 5 and the size of the write data. The position information corresponds to the write data top disk LBA 134*d* and the size corresponds to the writing block number 134*e*.

Exemplary Tables in a Case where Disk is Unmounted (Method 2)

FIG. 14 represents each exemplary table in a case where a disk 21 is unmounted (Method 1). As illustrated in FIG. 14, in the RAID group information table 131, "Exposed" indicating that any one of the disks 21 of the RAID configuration is unmounted is set. In other words, the unmount detector 142 detects unmount of a disk 21 that is mounted on DE#01 and Slot#02. The unmount detector 142 then sets "Exposed" for the RAID state 131*c* of the RAID group information table 131. In the RAID group information table 131, "-" is set for the in-use spare disk position information 131*f*. In other words, there is no spare disk in the RAID group.

In the DE/slot information table 132, "Broken" indicating that a disk 21 is unmounted is set for the slot state 132*d* corresponding to Slot#02 of DE#01 in which unmount of a disk 21 is detected. In other words, the unmount detector 142 sets "Broken" for the DE/slot information table 132 corresponding to the position information on the detected disk 21 that is unmounted.

In the writing management information table 133, "Method 2" is set for the management method 133*b*. In other words, because no spare disk position information is set for the in-use spare disk position information 131*f* corresponding to Slot#02 of DE#01, the unmount detector 142 sets "Method 2" for the writing management information management method 133*b*. Furthermore, the unmount detector 142 sets "100" for the memory buffer upper limit number 133*e* and sets "0" for the data number 133*f*. In the writing management information, the unmount detector 142 sets "1" for the RAID group number 133*g*, sets "RAID5" for the RAID type 133*h*, and sets "DE#01 Slot#2" for the disk-identifying information 133*i*. Furthermore, the unmount detector 142 sets "0x0 . . . 010bf8f60" for the unmount timestamp 133*j*.

Exemplary Tables in a Case where Write Request is Issued while Disk is Unmounted (Method 2)

FIG. 15 represents each exemplary table in a case where a write request is issued while a disk 21 is unmounted (Method 2). As illustrated in FIG. 15, in the DE/slot information table 132, the writing-preceding timestamp 132*e* and the writing-completion timestamp 132*f* are set. In other words, the write request manager 143 writes the current timestamp as a writing-preceding timestamp in the writing-preceding timestamp 132*e*. After the processing corresponding to the write request is completed, the write request manager 143 writes the current timestamp as a writing-completion timestamp in the writing-completion timestamp 132*f*. In other words, the writing-preceding timestamp 132*e* and the writing-completion timestamp 132*f* are different from each other.

If a write request is issued to the disk 21 for three times, "3" is set for the writing information number 133*d*. When the writing management sequence number 134*a* represents "0" and the sequence number 134*b* represents "0", "0x0 . . . 030000000" is set for the memory buffer address 134*c* in the writing information table 134. Furthermore, "0x0 . . . 01000" is set for the write data top disk LBA 134*d* and "0x80" is set for the writing block number 134*e*. When the writing management sequence number 134*a* represents "0" and the sequence number 134*b* represents "1", "0x0 . . . 03000A000" is set for the memory buffer address 134*c*. Furthermore, "0x0 . . . 03180" is set for the write data top disk LBA 134*d* and "0x80" is set for the writing block number 134*e*. When the writing management sequence number 134*a* represents "0" and the sequence number 134*b* represents "2", "0x0 . . . 03000A080" is set for the memory buffer address 134*c*. Furthermore, "0x0 . . . 0A080" is set for the write data top disk LBA 134*d* and "0x80" is set for the writing block number 134*e*. In other words, because the management method 133*b* represents "Method 2", the write request manager 143 writes data in an area of a memory buffer that is secured in the memory 13 and records the address of the memory buffer. Furthermore, the write request manager 143 records the position information on the position in which the write data is written to a normal disk 21 of the RAID 5 and the size of the write data. The position information corresponds to the write data top disk LBA 134*d* and the size corresponds to the writing block number 134*e*.

Exemplary Tables in a Case where Disk is Unmounted (Method 3)

FIG. 16 represents each exemplary table in a case where a disk 21 is unmounted (Method 3). As illustrated in FIG. 16, in the RAID group information table 131, "Exposed" indicating that any one of the disks 21 of the RAID configuration is unmounted is set. In other words, the unmount detector 142 detects unmount of a disk 21 that is mounted on DE#01 and Slot#02. The unmount detector 142 then sets "Exposed" for the RAID state 131*c* of the RAID group information table 131. In the RAID group information table 131, "-" is set for the in-use spare disk position information 131*f*. In other words, there is no spare disk in the RAID group.

In the DE/slot information table 132, "Broken" indicating that a disk 21 is unmounted is set for the slot state 132*d* corresponding to Slot#02 of DE#01 in which unmount of a disk 21 is detected. In other words, the unmount detector 142 sets "Broken" for the DE/slot information table 132 corresponding to the position information on the detected disk 21 that is unmounted.

In the writing management information table 133, "Method 3" is set for the management method 133*b*. In other words, because no spare disk position information is set for the in-use spare disk position information 131*f* corresponding to Slot#02 of DE#01, the unmount detector 142 sets "Method 3" for the writing management information management method 133*b*. In the writing management information, the unmount detector 142 sets "1" for the RAID group number 133*g*, sets "RAID5" for the RAID type 133*h*, and sets "DE#01 Slot#2" for the disk-identifying information 133*i*. Furthermore, the unmount detector 142 sets "0x0 . . . 010bf8f60" for the unmount timestamp 133*j*. Because the management method 133*b* represents "Method 3", "-" is set for the memory buffer upper limit number 133*e* and "-" is set for the data number 133*f*.

Exemplary Tables in a Case where Write Request is Issued while Disk is Unmounted (Method 3)

FIG. 17 represents each exemplary table in a case where a write request is issued while a disk 21 is unmounted (Method 3). As illustrated in FIG. 17, in the DE/slot information table 132, the writing-preceding timestamp 132*e* and the writing-completion timestamp 132*f* are set. In other words, the write request manager 143 writes the current timestamp as a writing-preceding timestamp to the writing-preceding timestamp 132*e*. After the processing corresponding to the write request is completed, the write request manager 143 writes the current timestamp as a writing-completion timestamp in the writing-completion timestamp 132f. In other words, the writing-preceding timestamp 132e and the writing-completion timestamp 132f are different from each other.

If a write request is issued to the disk 21 twice, "2" is set for the writing information number 133d. When the writing management sequence number 134a represents "0" and the sequence number 134b represents "0", "0x0 . . . 01000" is set for the write data top disk LBA 134d and "0x80" is set for the writing block number 134e in the writing information table 134. When the writing management sequence number 134a represents "0" and the sequence number 134b represents "1", "0x0 . . . 03180" is set for the write data top disk LBA 134d and "0x80" is set for the writing block number 134e. In other words, because the management method 133b represents "Method 3", the write request manager 143 records the position information representing the position in which the write data is written to a normal disk 21 of the RAID 5 and the size of the write data. The position information corresponds to the write data top disk LBA 134d and the size corresponds to the writing block number 134e.

Effects of Embodiment

According to the embodiment, the CM 10 monitors unmount and mount of each disk 21 of a RAID configuration. The CM 10 manages a write request for writing data to a disk 21 that is unmounted. Upon detecting mount of a disk 21 of the RAID configuration, the CM 10 makes a determination on consistency of the data of the disk 21 in which mount is detected on the basis of the managed write request. Upon determining that the data does not have consistency, the CM 10 performs processing for recovering data expected to be written by a write request that is issued to the disk 21 in which mount is detected while the disk 21 is unmounted and incorporates the disk 21 in an original RAID configuration. In such a configuration, when the position of a disk 21 of a RAID configuration is changed during operations, it is satisfactory if the CM 10 performs processing for recovering the data expected to be written by the write request that is issued while the disk 21 is unmounted, which shortens the time to change the RAID configuration.

According to the embodiment, the CM 10 stores, in the memory 13 and per disk 21, disk information (drive information) that associates an identifier that identifies a disk 21 with RAID information that is information on the RAID in which the disk 21 is incorporated. On the basis of the disk information that is stored in the memory 13 and disk information that is previously stored in the disk in which unmount or mount is detected, the CM 10 monitors unmount and mount of the disk 21 of the RAID configuration. In such a configuration, because each of the memory 13 and the disk 21 stores disk information, the CM 10 can detect mount of a specific unmounted disk 21 of the RAID configuration.

Furthermore, according to the embodiment, when a write request for writing data is issued to a disk 21 that is unmounted, the CM 10 manages timestamps preceding and following writing of the data to a different storage area that is determined for the disk 21 that is unmounted. When mount of the unmounted disk 21 is detected, the CM 10 makes a determination on consistency of the data by determining whether there is a difference between the timestamps preceding and following the writing of the data. Upon determining that there is a difference between the timestamps preceding and following the writing of the data, the CM 10 incorporates the disk 21 in an original RAID configuration by writing back the data from the different storage area in which the data is written while the disk 21 is unmounted. In such a configuration, the CM 10 makes a determination on the consistency of the data by using the timestamps preceding and following the writing of the data and recovers only data that lacks consistency, which shortens the time to change the RAID configuration.

Other Aspects

It has been described in the embodiment that the write data recovery unit 146 performs the recovery processing according to the writing management information management method 133b stored in the writing management information table 133. However, alternatively, the write data recovery unit 146 may perform recovery processing that corresponds to a predetermined management method.

In the embodiment, timestamps are used as information representing a writing-preceding time and completion of writing. Alternatively, given numerical values may be used instead of the timestamps. For example, "1" may be used as information representing a writing-preceding time and "9" may be used as information representing completion of writing. In other words, it is satisfactory if the writing-preceding time and completion of writing can be distinguished from the information.

The components of the devices illustrated in the drawings do not need to be configured physically in the same manner as that illustrated in the drawings. In other words, the specific modes of separation and combination of the devices are not limited to those illustrated in the drawings and the devices may be configured by entirely or partly being separated or combined functionally or physically according to various types of load or circumstances and according to an arbitrary unit. For example, the unmount detector and the mount detector 144 may be combined into a single unit. In contrast, the write data recovery unit 146 may be separated into a first recovery unit that performs Method 1, a second recovery unit that performs Method 2, a third recovery unit that performs Method 3, and a fourth recovery unit that performs Method 4. The various tables stored in the memory 13 may serve as external devices of the CM 10 and be connected via a network.

In the embodiment, by implementing the functions of the CM 10 by software, for example, a RAID configuration management program that implements the same functions as those of the CM 10 can be acquired. For example, the memory 13 stores the RAID configuration management program, mid-execution results of the program, etc. The CPU 14 reads the RAID configuration management program from the memory 13 and executes the program.

The RAID configuration management program is not necessarily stored in the memory 13 from the beginning. For example, the RAID configuration management program may be stored in a "potable physical medium", such as a flexible disk (FD), a CD-ROM, a DVD disk, an Magneto-optical disk, or an IC card, that is inserted into the CM 10 and the CM 10 may read the RAID configuration management program from the portable physical medium and execute the program.

According to the embodiment, the time to change the position of a drive of a RAID configuration can be reduced.

What is claimed is:

1. A RAID configuration management device that manages a RAID configuration that is constituted by a plurality of drives, the RAID configuration management device comprising:
 a processor, wherein the processor executes a process comprising:
  monitoring unmount and mount of each drive of the RAID configuration;

managing a write request for writing data to a drive that is unmounted;

when the monitoring detects mount of a drive of the RAID configuration, making a determination on consistency of the data of the drive in which mount is detected on the basis of the write request that is managed by the managing; and when the determining determines that the data lacks consistency, performing processing for recovering data expected to be written based on the write request that is issued to the drive in which mount is detected while the drive is unmounted and incorporates the drive in an original RAID configuration.

2. The RAID configuration management device according to claim 1, wherein the processor executes the process further comprising:

storing, per drive, drive information that associates identification information that identifies a drive with RAID information that is information on the RAID in which the drive is incorporated, wherein, on the basis of the drive information that is stored by the storing and drive information that is previously stored in the drive in which unmount or mount is detected, the monitoring monitors unmount and mount of the drive of the RAID configuration.

3. The RAID configuration management device according to claim 1, wherein when a write request for writing data is issued to a drive that is unmounted, the managing manages the write request by managing timestamps preceding and following writing of the data to a different storage area that is determined for the drive that is unmounted, when mount of the unmounted drive is detected, the determining makes a determination on the consistency of the data by determining whether there is a difference between the timestamps preceding and following the writing of the data, and when the determining determines that there is a difference between the timestamps preceding and following the writing of the data, the performing incorporates the drive to which the write request is issued in the original RAID configuration by writing back, to the drive, the data from the different storage area to which the data is written while the drive is unmounted.

4. A non-transitory computer-readable recording medium having stored therein a RAID configuration management program causing a RAID configuration management device to execute a process comprising:

monitoring unmount and mount of each drive of the RAID configuration;

managing a write request for writing data to a drive that is unmounted;

when the monitoring detects mount of a drive of the RAID configuration, making a determination on consistency of the data of the drive in which mount is detected on the basis of the write request that is managed by the managing; and when the determining determines that the data lacks consistency, performing processing for recovering data expected to be written based on the write request that is issued to the drive in which mount is detected while the drive is unmounted and incorporating the drive in an original RAID configuration.

5. A RAID configuration management method performed by a RAID configuration management device that manages a RAID configuration that is constituted by a plurality of drives, the RAID configuration management method comprising:

monitoring unmount and mount of each drive of the RAID configuration;

managing a write request for writing data to a drive that is unmounted;

when the monitoring detects mount of a drive of the RAID configuration, making a determination on consistency of the data of the drive in which mount is detected on the basis of the write request that is managed by the managing; and when the determining determines that the data lacks consistency, performing processing for recovering data expected to be written based on the write request that is issued to the drive in which mount is detected while the drive is unmounted and incorporating the drive in an original RAID configuration.

* * * * *